US012587988B2

(12) United States Patent　　　(10) Patent No.:　US 12,587,988 B2

Falkenberg　　　　　　　　　　　　(45) Date of Patent:　Mar. 24, 2026

(54) APPARATUS AND METHODS FOR IMPROVING TIME ADVANCE ALIGNMENT PROCESS IN NON-TERRESTRIAL WIRELESS NETWORK

(71) Applicant: Parsa Wireless Communications LLC, Stamford, CT (US)

(72) Inventor: Andreas Falkenberg, Escondido, CA (US)

( * ) Notice: Subject to any disclaimer, the term of this patent is extended or adjusted under 35 U.S.C. 154(b) by 824 days.

(21) Appl. No.: 17/731,503

(22) Filed: Apr. 28, 2022

(65) Prior Publication Data

US 2022/0353838 A1　　　Nov. 3, 2022

Related U.S. Application Data

(60) Provisional application No. 63/182,529, filed on Apr. 30, 2021.

(51) Int. Cl.
| | |
|---|---|
| *H04W 4/00* | (2018.01) |
| *H04W 24/10* | (2009.01) |
| *H04W 56/00* | (2009.01) |
| *H04W 74/0833* | (2024.01) |
| *H04W 74/0838* | (2024.01) |

(52) U.S. Cl.
CPC ....... *H04W 56/0045* (2013.01); *H04W 24/10* (2013.01); *H04W 74/0841* (2013.01); *H04W 74/0833* (2013.01); *H04W 74/0838* (2024.01)

(58) Field of Classification Search
CPC ............. H04W 56/0045; H04W 24/10; H04W 74/0841; H04W 56/00
See application file for complete search history.

(56) References Cited

U.S. PATENT DOCUMENTS

| | | | | |
|---|---|---|---|---|
| 6,275,701 | B1 * | 8/2001 | Cerwall ................ | H04W 76/25 |
| | | | | 455/436 |
| 6,449,290 | B1 * | 9/2002 | Willars ................ | H04B 7/2668 |
| | | | | 370/324 |
| 6,771,670 | B1 | 8/2004 | Pfahler | |
| 8,798,030 | B2 * | 8/2014 | Chin .................... | H04B 1/7087 |
| | | | | 370/350 |
| 11,271,699 | B1 * | 3/2022 | Eyuboglu ............. | H04L 1/1819 |
| 2010/0266063 | A1 | 10/2010 | Harel | |

(Continued)

FOREIGN PATENT DOCUMENTS

| | | |
|---|---|---|
| CN | 111294789 A | 6/2020 |
| EP | 2389034 B1 | 3/2011 |

(Continued)

OTHER PUBLICATIONS

GPP TSG RAN Meeting #88-e; RP-201038; Revised Work Item on NR Multicast and Broadcast Services (2013); Huwai; Jun. 29, 2020.

(Continued)

*Primary Examiner* — Elisabeth Benoit Magloire

(74) *Attorney, Agent, or Firm* — John F. Vodopia

(57) ABSTRACT

A method of time aligning by a user equipment (UE) requires measuring a downlink (DL) signal, including a first timing advance (TA) value. The DL signal is transmitted from a base station (BS) to derive measurement results. The method further includes transmitting the measurement results to a base station (BS), computing a second TA value from the first TA value, and aligning uplink (UL) transmission timing by the second TA value.

13 Claims, 18 Drawing Sheets

1600

(56)                    References Cited

U.S. PATENT DOCUMENTS

| | | | |
|---|---|---|---|
| 2013/0250925 A1* | 9/2013 | Lohr | H04W 56/0045 |
| | | | 370/336 |
| 2013/0258959 A1* | 10/2013 | Dinan | H04W 56/0005 |
| | | | 370/329 |
| 2014/0029586 A1* | 1/2014 | Loehr | H04L 5/0055 |
| | | | 370/336 |
| 2015/0098400 A1* | 4/2015 | Lee | H04J 11/005 |
| | | | 370/329 |
| 2015/0189610 A1* | 7/2015 | Siomina | H04L 5/14 |
| | | | 370/280 |
| 2016/0109259 A1* | 4/2016 | Gunnarsson | G01C 5/06 |
| | | | 73/1.59 |
| 2016/0192306 A1* | 6/2016 | Ma | H04W 56/00 |
| | | | 370/350 |
| 2017/0013565 A1* | 1/2017 | Pelletier | H04W 52/365 |
| 2017/0303157 A1 | 10/2017 | Siomina | |
| 2019/0182632 A1 | 6/2019 | Fujishiro | |
| 2019/0191403 A1* | 6/2019 | Goel | H04L 27/2695 |
| 2019/0215862 A1* | 7/2019 | Kim | H04W 74/0833 |
| 2019/0289627 A1* | 9/2019 | Blasco Serrano | H04W 56/00 |
| 2019/0386771 A1 | 12/2019 | Liu | |
| 2020/0077458 A1 | 3/2020 | Stauffer | |
| 2020/0091978 A1 | 3/2020 | Noh | |
| 2020/0137714 A1* | 4/2020 | Kumar | H04W 72/51 |
| 2020/0350969 A1 | 11/2020 | Shimezawa | |
| 2020/0396591 A1 | 12/2020 | Ou | |
| 2020/0396709 A1* | 12/2020 | Sun | H04L 5/0051 |
| 2020/0413301 A1 | 12/2020 | Shi | |
| 2021/0099324 A1 | 4/2021 | Choi | |
| 2021/0105055 A1 | 4/2021 | Chae | |
| 2021/0219255 A1* | 7/2021 | Zhang | H04W 36/249 |
| 2021/0259040 A1 | 8/2021 | Babaei | |
| 2021/0274525 A1 | 9/2021 | Wei | |
| 2021/0410180 A1 | 12/2021 | Tsai | |
| 2022/0060923 A1 | 2/2022 | Zheng | |
| 2023/0164719 A1* | 5/2023 | Yuan | H04W 56/004 |
| | | | 370/503 |
| 2023/0217497 A1* | 7/2023 | Wang | H04W 56/0005 |
| | | | 370/328 |

FOREIGN PATENT DOCUMENTS

| | | |
|---|---|---|
| EP | 3509343 A1 | 1/2019 |
| WO | 2015169371 A1 | 11/2015 |
| WO | 2016141514 A1 | 9/2016 |
| WO | 2016196044 A1 | 12/2016 |
| WO | 2017086843 A1 | 5/2017 |
| WO | 2020167747 A1 | 8/2020 |
| WO | 2020220233 A1 | 11/2020 |
| WO | 2020247043 A1 | 12/2020 |
| WO | 2021033085 A1 | 2/2021 |
| WO | 2021078357 A1 | 4/2021 |
| WO | 2021098074 A1 | 5/2021 |
| WO | 2021152405 A1 | 8/2021 |
| WO | 2021163527 A1 | 8/2021 |
| WO | 2021228406 A1 | 11/2021 |
| WO | 2022078804 A1 | 4/2022 |

OTHER PUBLICATIONS

3GPP TS 36.300; 3rd Generation Partnership Project; Technical Specification Group Radio Access Network; NR; Radio Resource Control (RRC) protocol specification (Release 16) (Jun. 2021).

3GPP TS 38.331;3rd Generation Partnership Project; Technical Specification Group Radio Access Network; NR; Medium Access Control (MAC) protocol specification (Release 16); (Dec. 2020).
3GPP TSG WG1 Meeting #103-E; Intel Corp., Sidelink Enhancements for UE Power Saving; R1-2008998; Oct. 26, 2020.
3GPP TSG RAN WG1 #106-e; Interdigital Inc.; Sidelink Resourse Allocation for Power Saving; R1-2108035; Aug. 16, 2021.
3GPP TSG RAN WG2 Meeting of #114-e; Report from email discussion [AT114-e][027][QoE] Start and Stop (Lenovo); May 19, 2021.
Scheffel, et al.; WSN Data Confidence Attribution Using Predictors; 2018 Eighth Latin American Symposium on Dependable Computing (LADC); 2018.
3GPP_TS_28_404; 3rd Generation Partnership Project; Technical Solution Group Services and System Aspects; Mar. 27, 2020.
3GPP TSG RAN WG2 Meeting # 114-e; Further Discussion on QoE Measurement Collection in NR Standalone; R2_2105214; May 19, 2021.
3GPP TSG RAN WG2 Meeting # 114; Change Request; R2_2106554; May 19, 2021.
3GPP TSG-RAN WG3 #112-e; ZTE, China Telecom; TP for TS 38.300 Introduce NR QoE; May 17, 2021.
3GPP TR 38.890; Apr. 2021; Study on NR QoE Management and Optimizations for Diverse Services; Release 17; Apr. 9, 2021.
3GPP TSG RAN WG1 #105-e; Feature Lead Summary # 5 on RAN basic functions for broadcast/multicast for UEs in RRC_IDLE/RRC_Inactive States; May 10, 2021.
3GPP YSG-RAN WG2 Meeting #112-e; Qualcomm;NR Multicast-Broadcast Services and Configuration for UEs in Different RRC States; R2_2009038; Nov. 2, 2020.
3GPP YSG-RAN WG2 Meeting #111 Electronic; Scope and Architecture Analysis of NR MBS; R2_2007442; Aug. 17, 2020.
3GPP TSG-RAN WG2 Meeting #113e; Futurewei; Discussion on NR MBS Solutions of Mode 2 Delivery; R2-2100631; Jan. 25, 2021.
3GPP TSG-RAN WG2 Meeting #114-e; MBA MAC Layer and Group Scheduling Aspects; R2-2104876; May 19, 2021.
3GPP TSG-RAN WG2 Meeting #113bis electronic; Discussion on QoE Measurement Pausing and Resuming; R2-2103146; Apr. 2021.
3GPP TSG RAN WG1 #102-e Meeting; On Basic Functions for Broadcast/Multicast for RRC_IDLE/RRC_Inactive UEs; R1-2006175; Aug. 17, 2020.
3GPP TR 23.757; Study on Architectural Enhancements for 5G Multicast-Broadcast Services (Release 17); Mar. 2021.
3GPP FSG-RAN WG2 Meeting #111 electronic; Overview of NR MBS; R2-20070033; Aug. 18, 2020.
3GPP TSG-RAN WG2 Meeting #113-bis-e; ZTE Corp.; Discussion on Pause/Resume NR QoE Reporting; R2-2104271; Apr. 12, 2021.
3GPP TSG-RAN WG2 Meeting 113bis-e; Multicast Session Reception in RRC Inactive; R2-2103907; Apr. 12, 2021.
3GPP TSG RAN WG1 #105-e; Intel Corp.; NR MBS Group Scheduling for RRC_Connected UEs; R1-2104928; May 19, 2021.
3GPP TSG-RAN WG2 Meeting #113bis Electronic; QoE Reporting Control by RAN Awareness on QoE Parameter; R2-2103556; Apr. 12, 2021.
3GPP TSG-RAN WG2 Meeting #112-e; ZTE; Discussion on QoE in NR; R2-2010476; Nov. 2, 2020.
3GPP TSG-RAN WG2 Meeting #112-e; Nokia; Analysis of Solutions for Paging Collision; R2-2009264; Nov. 2, 2020.
3GPP TSG RAN WG2 #113bis; Ericsson; Configuration and Reporting for QoE Management; R2-2103049; Apr. 12, 2021.
3GPP TSG-RAN WG2 Meeting #97; Change Request; R2-1702256; Feb. 13, 2017.
3GPP TSG RAN WG1 Meeting #92bis; Apple; Discussion on Beam Measurement and Reporting; R1-1804770; Apr. 16, 2018.

* cited by examiner

| Transport channel Logical channel | BCH | PCH | DL-SCH |
|---|---|---|---|
| BCCH | x | | x |
| PCCH | | x | |
| CCCH | | | x |
| DCCH | | | x |
| DTCH | | | x |

FIG. 3A

| Transport channel Logical channel | UL-SCH | RACH |
|---|---|---|
| CCCH | x | |
| DCCH | x | |
| DTCH | x | |

FIG. 3B

| Transport channel Logical channel | SL-BCH | SL-SCH |
|---|---|---|
| SBCCH | x | |
| SCCH | | x |
| STCH | | x |

FIG. 3C

| Transport channel | Physical channel | PDSCH | PDCCH | PBCH |
|---|---|---|---|---|
| BCH | | | | X |
| PCH | | X | | |
| DL-SCH | | X | | |

| Transport channel | Physical channel | PUSCH | PUCCH | PRACH |
|---|---|---|---|---|
| UL-SCH | | X | | |
| RACH | | | | X |

| Transport channel | Physical channel | PSSCH | PSCCH | PSFCH | PSBCH |
|---|---|---|---|---|---|
| SL-BCH | | | | | X |
| SL-SCH | | X | | | |

| Physical Signal | DM-RS | PT-RS | PRS | CSI-RS | PSS | SSS | SRS | S-PSS | S-SSS |
|---|---|---|---|---|---|---|---|---|---|
| DL | X | X | X | X | X | X | | | |
| UL | X | X | | | | | X | | |
| SL | X | X | | X | | | | X | X |

FIG. 6

1653 — gNB receives path propagation delay from UEs

1657 — gNB calculates TAC values

1661 — gNB transmit TAC values to UEs

1650

1603 — UE measures path propagation delay

1607 — UE transmits measured delay to a gNB

1611 — UE receive a correction value

1615 — UE adjusts timing

1600

APPARATUS AND METHODS FOR IMPROVING TIME ADVANCE ALIGNMENT PROCESS IN NON-TERRESTRIAL WIRELESS NETWORK

CROSS-REFERENCE TO RELATED APPLICATIONS

This application claims priority under 35 USC § 119(e) from U.S. Provisional Patent Application No. 63/182,529, filed on Apr. 30, 2021 ("the provisional application"); the content of the provisional patent application is incorporated herein by reference.

BACKGROUND OF THE INVENTION

The present invention is directed to 5G, which is the $5^{th}$ generation mobile network. It is a new global wireless standard after 1G, 2G, 3G, and 4G networks. 5G enables networks designed to connect machines, objects and devices.

The invention is more specifically directed to a method of time aligning by a user equipment (UE), the method including measuring a downlink (DL) signal, including a first timing advance (TA) value, the DL signal transmitted from a base station (BS) to derive measurement results; transmitting the measurement results to a base station (BS); computing a second TA value from the first TA value; and aligning uplink (UL) transmission timing by the second TA value.

SUMMARY OF THE INVENTION

In one embodiment, the invention method facilitates time aligning by a user equipment (UE), including measuring a downlink (DL) signal, including a first timing advance (TA) value, the DL signal transmitted from a base station (BS) to derive measurement results; transmitting the measurement results to a base station (BS); computing a second TA value from the first TA value; and aligning uplink (UL) transmission timing by the second TA value. The measuring includes estimating a time difference between transmission of the downlink (DL) signal from the base station (BS) and reception of the DL signal at the user equipment (UE). The transmitted measurement results include a time difference between transmission of the downlink (DL) signal from the base station (BS) and reception of the DL signal at the user equipment (UE).

Preferably, the computing includes: calculating a first calculated value by raising the first timing advance (TA) value to an Nth power, where N is an integer or real number and multiplying the first calculated value by a scalar quantity. The first timing advance (TA) value is equal to a difference between a first timing value based on the measurement results, and a second timing value; the difference adjusts the second TA value, and the second TA value is proportional to the difference. For that matter, the second timing advance (TA) value is equal to the first TA value.

In another embodiment, the invention provides a method of time aligning, by a base station (BS). The method includes receiving a message comprising measurement reports from a user equipment (UE), computing a first timing advance (TA) value from the measurement reports, computing a second TA value from the first TA value, and a third TA value and transmitting the second TA value to a user equipment (UE). The second timing advance (TA) value is equal to a difference between the first TA value and the third TA value. The third timing advance (TA) value is a preferred TA value of the user equipment (UE). Preferably, the transmitting is via a physical random access channel (PRACH).

In another embodiment, the invention provides a method of time aligning, by a base station (BS). The method includes measuring uplink (UL) signals transmitted from one or more user equipments (UEs), and deriving measurement results therefrom; computing a first time advance (TA) value from the measurement results; computing a second TA value from the first TA value, and a third TA value; and transmitting the second TA value to the one or more UEs. The second timing advance (TA) value is equal to a difference between the second TA value and the third TA value. The third timing advance (TA) value is a preferred TA value of the user equipment (UE).

In another embodiment, the invention provides a method of time aligning, by a user equipment (UE), that includes receiving from a base station (BS) a first timing advance (TA) value, computing a second TA value from the first TA value and aligning uplink (UL) transmission timing by the second TA value. The computing can include: calculating a first calculated value by raising the first timing advance (TA) value to an Nth power, where N is a real or integer number; and multiplying the first calculated value by a scalar quantity. The first timing advance (TA) value is equal to a difference between the first TA value, and the second timing value, and wherein the difference adjust the second TA value, and the second TA value is proportional to the difference. The second timing advance (TA) value is equal to the first TA value.

The invention also provides a method of time aligning, by a user equipment (UE). The method includes measuring a downlink (DL) signal transmitted from a base station (BS), and deriving a measurement result therefrom, computing a difference between the measurement result and an uplink signal, computing a first time advance (TA) value from the difference, comparing the first TA value with a pre-defined value, and computing a second TA value if the first TA value is greater than the pre-defined value, or computing a third TA value if the first TA value is less than the pre-defined value and aligning uplink (UL) transmission timing according to the second or the third TA value.

The invention also provides a user equipment (UE) arranged with a transceiver configured to: measure a downlink (DL) signal transmitted from a base station (BS), and derive measurement results therefrom, to transmit the measurement results to a base station (BS) and receive from the BS a first timing advance (TA) value; and a processor in communication with the transceiver, the processor configured to: compute a second TA value from the first TA value and align uplink (UL) transmission timing according to the second TA value.

In addition, the invention provides a base station (BS), where the base station comprises a transceiver configured to measure uplink (UL) signals transmitted from one or more user equipments (UEs), and deriving measurement results therefrom and a processor in communication with the transceiver, the processor configured to: compute a first timing advance (TA) value from the measurement results and compute a second TA value form the first TA value, and a third TA value; wherein the transceiver is further configured to: transmit the second TA value to the one or more UEs.

BRIEF DESCRIPTION OF THE DRAWINGS

FIG. 3A, FIG. 3B and FIG. 3C show example mappings between logical channels and transport channels in downlink, uplink and sidelink, respectively, according to some aspects of some of various exemplary embodiments of the present disclosure.

FIG. 6 shows example physical signals in downlink, uplink and sidelink according to some aspects of some of various exemplary embodiments of the present disclosure.

DETAILED DESCRIPTION

Figure 1:
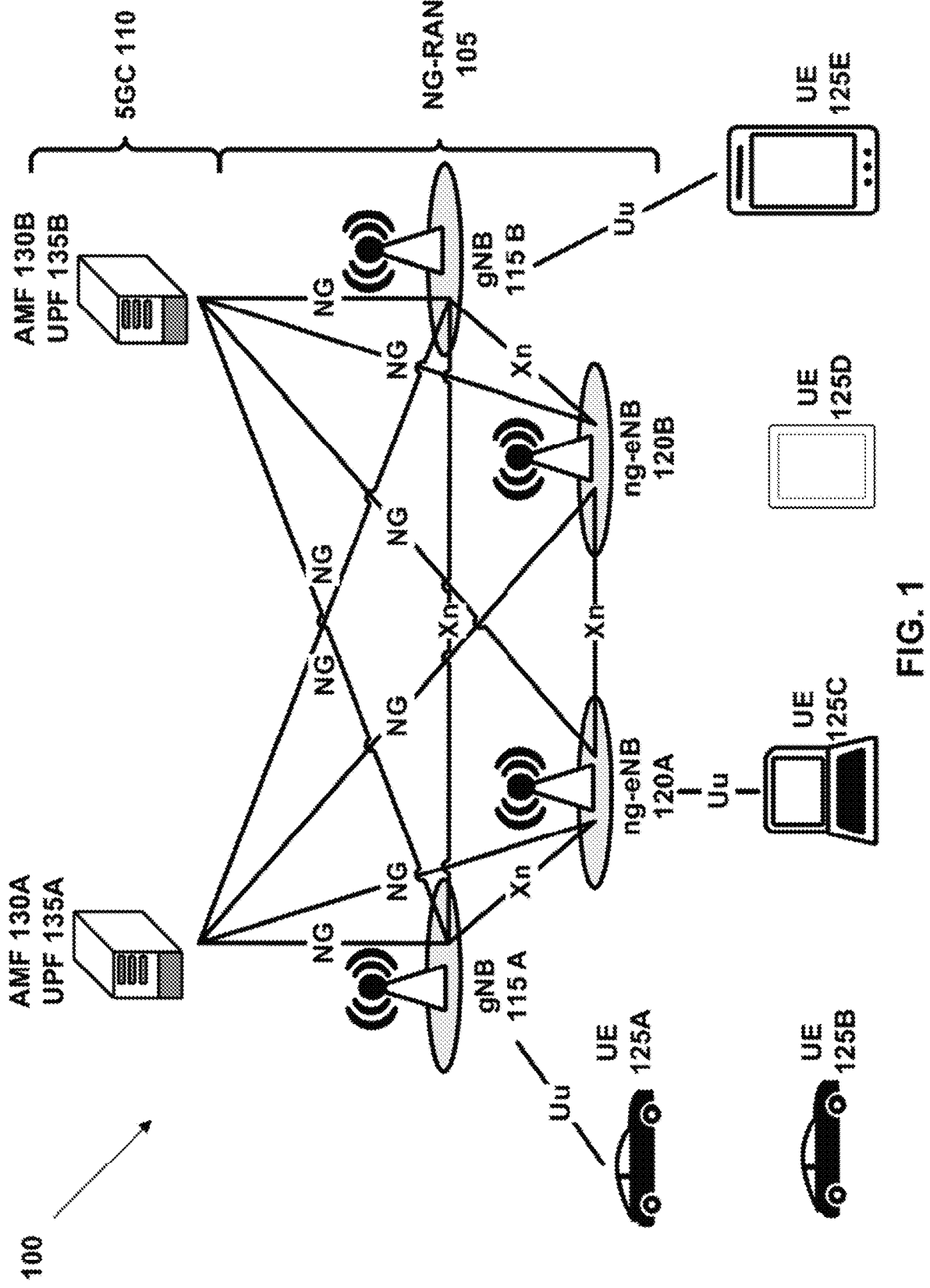
FIG. 1 shows an example of a system of mobile communications according to some aspects of some of various exemplary embodiments of the present disclosure.

FIG. 1 shows an example of a system of mobile communications 100 according to some aspects of some of various exemplary embodiments of the present disclosure. The system of mobile communication 100 may be operated by a wireless communications system operator such as a Mobile Network Operator (MNO), a private network operator, a Multiple System Operator (MSO), an Internet of Things (IOT) network operator, etc., and may offer services such as voice, data (e.g., wireless Internet access), messaging, vehicular communications services such as Vehicle to Everything (V2X) communications services, safety services, mission critical service, services in residential, commercial or industrial settings such as IoT, industrial IOT (IIOT), etc.

The system of mobile communications 100 may enable various types of applications with different requirements in terms of latency, reliability, throughput, etc. Example supported applications include enhanced Mobile Broadband (eMBB), Ultra-Reliable Low-Latency Communications (URLLC), and massive Machine Type Communications (mMTC). eMBB may support stable connections with high peak data rates, as well as moderate rates for cell-edge users. URLLC may support application with strict requirements in terms of latency and reliability and moderate requirements in terms of data rate. Example mMTC application includes a network of a massive number of IoT devices, which are only sporadically active and send small data payloads.

The system of mobile communications 100 may include a Radio Access Network (RAN) portion and a core network portion. The example shown in FIG. 1 illustrates a Next Generation RAN (NG-RAN) 105 and a 5G Core Network (5G-CN) 110 as examples of the RAN and core network, respectively. Other examples of RAN and core network may be implemented without departing from the scope of this disclosure. Other examples of RAN include Evolved Universal Terrestrial Radio Access Network (EUTRAN), Universal Terrestrial Radio Access Network (UTRAN), etc. Other examples of core network include Evolved Packet Core (EPC), UMTS Core Network (UCN), etc. In some examples, the RAN or 5G-CN may be connected to a Non-Terrestrial Network (NTN) via a gateway interface. The RAN implements a Radio Access Technology (RAT) and resides between User Equipments (UEs) 125 and the core network. Examples of such RATs include New Radio (NR), Long Term Evolution (LTE) also known as Evolved Universal Terrestrial Radio Access (EUTRA), Universal Mobile Telecommunication System (UMTS), etc. The RAT of the example system of mobile communications 100 may be NR. The core network resides between the RAN and one or more external networks (e.g., data networks) and is responsible for functions such as mobility management, authentication, session management, setting up bearers and application of different Quality of Services (QoSs). The functional layer between the UE 125 and the RAN (e.g., the NG-RAN 105) may be referred to as Access Stratum (AS) and the functional layer between the UE 125 and the core network (e.g., the 5G-CN 110) may be referred to as Non-access Stratum (NAS).

The UEs 125 may include wireless transmission and reception means for communications with one or more nodes in the RAN, one or more relay nodes, or one or more other UEs, etc. Example of UEs include, but are not limited to, smartphones, tablets, laptops, computers, wireless transmission and/or reception units in a vehicle, V2X or Vehicle to Vehicle (V2V) devices, wireless sensors, IoT devices, HOT devices, etc. Other names may be used for UEs such as a Mobile Station (MS), terminal equipment, terminal node, client device, mobile device, etc.

The RAN may include nodes (e.g., base stations) for communications with the UEs. For example, the NG-RAN 105 of the system of mobile communications 100 may comprise nodes for communications with the UEs 125. Different name for the RAN nodes may be used, for example depending on the RAT used for the RAN. A RAN node may be referred to as Node B (NB) in a RAN that used the UMTS RAT. A RAN node may be referred to as an evolved Node B (eNB) in a RAN that uses LTE/EUTRA RAT. For the illustrative example of the system of mobile communications 100 in FIG. 1, the nodes of an NG-RAN 105 may be either a next generation Node B (gNB) 115 or a next generation evolved Node B (ng-eNB) 120. In this specification, the terms base station, RAN node, gNB and ng-eNB may be used interchangeably. The gNB 115 may provide NR user plane and control plane protocol terminations towards the UE 125. The ng-eNB 120 may provide E-UTRA user plane and control plane protocol terminations towards the UE 125. An interface between the gNB 115 and the UE 125 or between the ng-eNB 120 and the UE 125 may be referred to as a Uu interface. The Uu interface may be established with a user plane protocol stack and a control plane protocol stack. For a Uu interface, the direction from the base station (e.g., the gNB 115 or the ng-eNB 120) to the UE 125 may be referred to as downlink and the direction from the UE 125 to the base station (e.g., gNB 115 or ng-eNB 120) may be referred to as uplink.

The gNBs 115 and ng-eNBs 120 may be interconnected with each other by means of an Xn interface. The Xn interface may comprise an Xn User plane (Xn-U) interface and an Xn Control plane (Xn-C) interface. The transport network layer of the Xn-U interface may be built on Internet Protocol (IP) transport and GPRS Tunneling Protocol (GTP) may be used on top of User Datagram Protocol (UDP)/IP to carry the user plane protocol data units (PDUs). Xn-U may provide non-guaranteed delivery of user plane PDUs and may support data forwarding and flow control. The transport network layer of the Xn-C interface may be built on Stream Control Transport Protocol (SCTP) on top of IP. The application layer signaling protocol may be referred to as XnAP (Xn Application Protocol). The SCTP layer may provide the guaranteed delivery of application layer messages. In the transport IP layer, point-to-point transmission may be used to deliver the signaling PDUs. The Xn-C interface may support Xn interface management, UE mobility management, including context transfer and RAN paging, and dual connectivity.

The gNBs 115 and ng-eNBs 120 may also be connected to the 5GC 110 by means of the NG interfaces, more specifically to an Access and Mobility Management Function (AMF) 130 of the 5GC 110 by means of the NG-C interface and to a User Plane Function (UPF) 135 of the 5GC 110 by means of the NG-U interface. The transport network layer of the NG-U interface may be built on IP transport and GTP protocol may be used on top of UDP/IP to carry the user plane PDUs between the NG-RAN node (e.g., gNB 115 or ng-eNB 120) and the UPF 135. NG-U may provide non-guaranteed delivery of user plane PDUs between the NG-RAN node and the UPF. The transport network layer of the NG-C interface may be built on IP transport. For the reliable transport of signaling messages, SCTP may be added on top of IP. The application layer signaling protocol may be referred to as NGAP (NG Application Protocol). The SCTP layer may provide guaranteed delivery of application layer messages. In the transport, IP layer point-to-point transmission may be used to deliver the signaling PDUs. The NG-C interface may provide the following functions: NG interface management; UE context management; UE mobility management; transport of NAS messages; paging; PDU Session Management; configuration transfer; and warning message transmission.

The gNB 115 or the ng-eNB 120 may host one or more of the following functions: Radio Resource Management functions such as Radio Bearer Control, Radio Admission Control, Connection Mobility Control, Dynamic allocation of resources to UEs in both uplink and downlink (e.g., scheduling); IP and Ethernet header compression, encryption and integrity protection of data; Selection of an AMF at UE attachment when no routing to an AMF can be determined from the information provided by the UE; Routing of User Plane data towards UPF(s); Routing of Control Plane information towards AMF; Connection setup and release; Scheduling and transmission of paging messages; Scheduling and transmission of system broadcast information (e.g., originated from the AMF); Measurement and measurement reporting configuration for mobility and scheduling; Transport level packet marking in the uplink; Session Management; Support of Network Slicing; QoS Flow management and mapping to data radio bearers; Support of UEs in RRC Inactive state; Distribution function for NAS messages; Radio access network sharing; Dual Connectivity; Tight interworking between NR and E-UTRA; and Maintaining security and radio configuration for User Plane 5G system (5GS) Cellular IoT (CIoT) Optimization.

The AMF 130 may host one or more of the following functions: NAS signaling termination; NAS signaling security; AS Security control; Inter CN node signaling for mobility between 3GPP access networks; Idle mode UE Reachability (including control and execution of paging retransmission); Registration Area management; Support of intra-system and inter-system mobility; Access Authentication; Access Authorization including check of roaming rights; Mobility management control (subscription and policies); Support of Network Slicing; Session Management Function (SMF) selection; Selection of 5GS CIoT optimizations.

The UPF 135 may host one or more of the following functions: Anchor point for Intra-/Inter-RAT mobility (when applicable); External PDU session point of interconnect to Data Network; Packet routing & forwarding; Packet inspection and User plane part of Policy rule enforcement; Traffic usage reporting; Uplink classifier to support routing traffic flows to a data network; Branching point to support multi-homed PDU session; QoS handling for user plane, e.g.

packet filtering, gating, UL/DL rate enforcement; Uplink Traffic verification (Service Data Flow (SDF) to QoS flow mapping); Downlink packet buffering and downlink data notification triggering.

As shown in FIG. 1, the NG-RAN 105 may support the PC5 interface between two UEs 125 (e.g., UE 125A and UE125B). In the PC5 interface, the direction of communications between two UEs (e.g., from UE 125A to UE 125B or vice versa) may be referred to as sidelink. Sidelink transmission and reception over the PC5 interface may be supported when the UE 125 is inside NG-RAN 105 coverage, irrespective of which RRC state the UE is in, and when the UE 125 is outside NG-RAN 105 coverage. Support of V2X services via the PC5 interface may be provided by NR sidelink communication and/or V2X sidelink communication.

PC5-S signaling may be used for unicast link establishment with Direct Communication Request/Accept message. A UE may self-assign its source Layer-2 ID for the PC5 unicast link for example based on the V2X service type. During unicast link establishment procedure, the UE may send its source Layer-2 ID for the PC5 unicast link to the peer UE, e.g., the UE for which a destination ID has been received from the upper layers. A pair of source Layer-2 ID and destination Layer-2 ID may uniquely identify a unicast link. The receiving UE may verify that the said destination ID belongs to it and may accept the Unicast link establishment request from the source UE. During the PC5 unicast link establishment procedure, a PC5-RRC procedure on the Access Stratum may be invoked for the purpose of UE sidelink context establishment as well as for AS layer configurations, capability exchange etc. PC5-RRC signaling may enable exchanging UE capabilities and AS layer configurations such as Sidelink Radio Bearer configurations between pair of UEs for which a PC5 unicast link is established.

NR sidelink communication may support one of three types of transmission modes (e.g., Unicast transmission, Groupcast transmission, and Broadcast transmission) for a pair of a Source Layer-2 ID and a Destination Layer-2 ID in the AS. The Unicast transmission mode may be characterized by: Support of one PC5-RRC connection between peer UEs for the pair; Transmission and reception of control information and user traffic between peer UEs in sidelink; Support of sidelink HARQ feedback; Support of sidelink transmit power control; Support of RLC Acknowledged Mode (AM); and Detection of radio link failure for the PC5-RRC connection. The Groupcast transmission may be characterized by: Transmission and reception of user traffic among UEs belonging to a group in sidelink; and Support of sidelink HARQ feedback. The Broadcast transmission may be characterized by: Transmission and reception of user traffic among UEs in sidelink.

A Source Layer-2 ID, a Destination Layer-2 ID and a PC5 Link Identifier may be used for NR sidelink communication. The Source Layer-2 ID may identify the sender of the data in NR sidelink communication. The Source Layer-2 ID may be 24 bits long and may be split in the MAC layer into two bit strings: One bit string may be the LSB part (8 bits) of Source Layer-2 ID and forwarded to physical layer of the sender. This may identify the source of the intended data in sidelink control information and may be used for filtering of packets at the physical layer of the receiver; and the Second bit string may be the MSB part (16 bits) of the Source Layer-2 ID and may be carried within the Medium Access Control (MAC) header. This may be used for filtering of packets at the MAC layer of the receiver. The Destination Layer-2 ID may identify the target of the data in NR sidelink communication. For NR sidelink communication, the Destination Layer-2 ID may be 24 bits long and may be split in the MAC layer into two bit strings: One bit string may be the LSB part (16 bits) of Destination Layer-2 ID and forwarded to physical layer of the sender. This may identify the target of the intended data in sidelink control information and may be used for filtering of packets at the physical layer of the receiver; and the Second bit string may be the MSB part (8 bits) of the Destination Layer-2 ID and may be carried within the MAC header. This may be used for filtering of packets at the MAC layer of the receiver. The PC5 Link Identifier may uniquely identify the PC5 unicast link in a UE for the lifetime of the PC5 unicast link. The PC5 Link Identifier may be used to indicate the PC5 unicast link whose sidelink Radio Link failure (RLF) declaration was made and PC5-RRC connection was released.

Figure 2A:
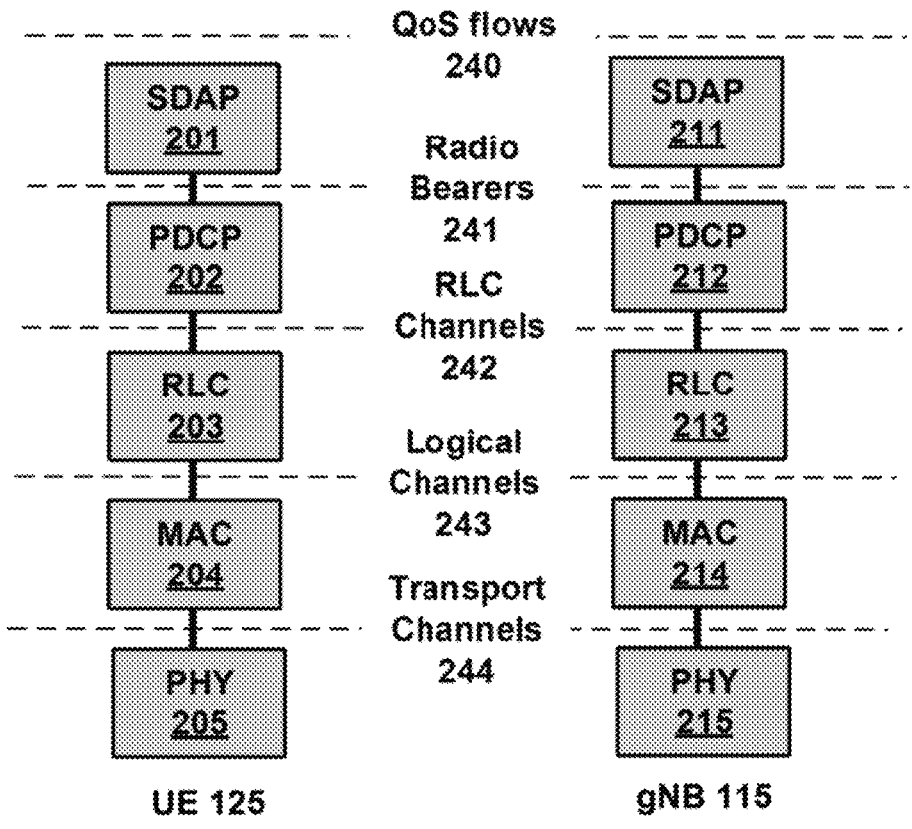
FIG. 2A and FIG. 2B show examples of radio protocol stacks for user plane and control plane, respectively, according to some aspects of some of various exemplary embodiments of the present disclosure.
Figure 2B:
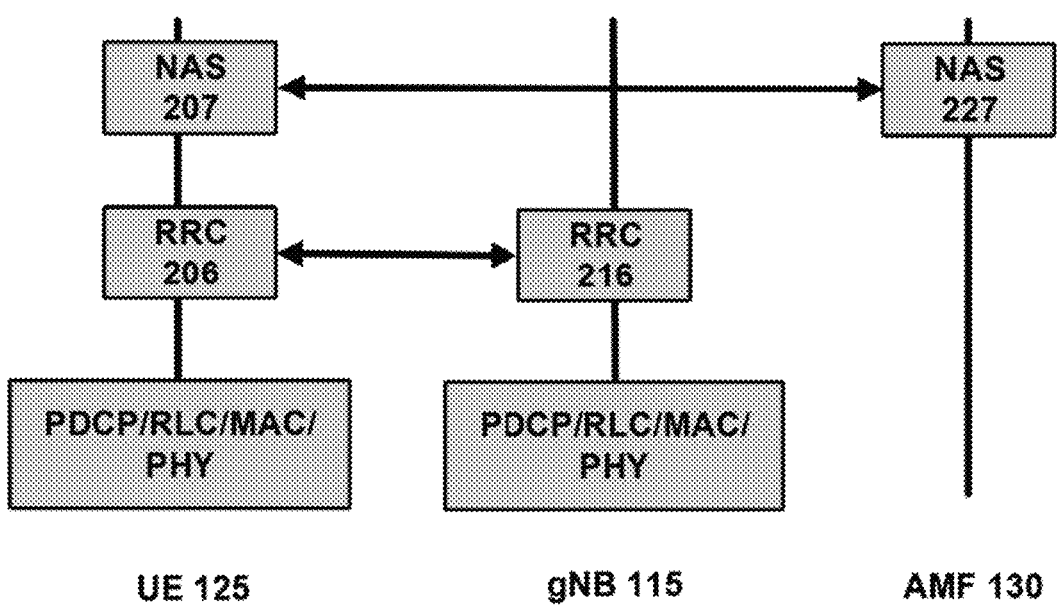

FIG. 2A and FIG. 2B show examples of radio protocol stacks for user plane and control plane, respectively, according to some aspects of some of various exemplary embodiments of the present disclosure. As shown in FIG. 2A, the protocol stack for the user plane of the Uu interface (between the UE 125 and the gNB 115) includes Service Data Adaptation Protocol (SDAP) 201 and SDAP 211, Packet Data Convergence Protocol (PDCP) 202 and PDCP 212, Radio Link Control (RLC) 203 and RLC 213, MAC 204 and MAC 214 sublayers of layer 2 and Physical (PHY) 205 and PHY 215 layer (layer 1 also referred to as L1).

The PHY 205 and PHY 215 offer transport channels 244 to the MAC 204 and MAC 214 sublayer. The MAC 204 and MAC 214 sublayer offer logical channels 243 to the RLC 203 and RLC 213 sublayer. The RLC 203 and RLC 213 sublayer offer RLC channels 242 to the PDCP 202 and PCP 212 sublayer. The PDCP 202 and PDCP 212 sublayer offer radio bearers 241 to the SDAP 201 and SDAP 211 sublayer. Radio bearers may be categorized into two groups: Data Radio Bearers (DRBs) for user plane data and Signaling Radio Bearers (SRBs) for control plane data. The SDAP 201 and SDAP 211 sublayer offers QoS flows 240 to 5GC.

The main services and functions of the MAC 204 or MAC 214 sublayer include: mapping between logical channels and transport channels; Multiplexing/demultiplexing of MAC Service Data Units (SDUs) belonging to one or different logical channels into/from Transport Blocks (TB) delivered to/from the physical layer on transport channels; Scheduling information reporting; Error correction through Hybrid Automatic Repeat Request (HARQ) (one HARQ entity per cell in case of carrier aggregation (CA)); Priority handling between UEs by means of dynamic scheduling; Priority handling between logical channels of one UE by means of Logical Channel Prioritization (LCP); Priority handling between overlapping resources of one UE; and Padding. A single MAC entity may support multiple numerologies, transmission timings and cells. Mapping restrictions in logical channel prioritization control which numerology(ies), cell(s), and transmission timing(s) a logical channel may use.

The HARQ functionality may ensure delivery between peer entities at Layer 1. A single HARQ process may support one TB when the physical layer is not configured for downlink/uplink spatial multiplexing, and when the physical layer is configured for downlink/uplink spatial multiplexing, a single HARQ process may support one or multiple TBs.

The RLC 203 or RLC 213 sublayer may support three transmission modes: Transparent Mode (TM); Unacknowledged Mode (UM); and Acknowledged Mode (AM). The RLC configuration may be per logical channel with no dependency on numerologies and/or transmission durations, and Automatic Repeat Request (ARQ) may operate on any of the numerologies and/or transmission durations the logical channel is configured with.

The main services and functions of the RLC 203 or RLC 213 sublayer depend on the transmission mode (e.g., TM, UM or AM) and may include: Transfer of upper layer PDUs; Sequence numbering independent of the one in PDCP (UM and AM); Error Correction through ARQ (AM only); Segmentation (AM and UM) and re-segmentation (AM only) of RLC SDUs; Reassembly of SDU (AM and UM); Duplicate Detection (AM only); RLC SDU discard (AM and UM); RLC re-establishment; and Protocol error detection (AM only).

The automatic repeat request within the RLC 203 or RLC 213 sublayer may have the following characteristics: ARQ retransmits RLC SDUs or RLC SDU segments based on RLC status reports; Polling for RLC status report may be used when needed by RLC; RLC receiver may also trigger RLC status report after detecting a missing RLC SDU or RLC SDU segment.

The main services and functions of the PDCP 202 or PDCP 212 sublayer may include: Transfer of data (user plane or control plane); Maintenance of PDCP Sequence Numbers (SNs); Header compression and decompression using the Robust Header Compression (ROHC) protocol; Header compression and decompression using EHC protocol; Ciphering and deciphering; Integrity protection and integrity verification; Timer based SDU discard; Routing for split bearers; Duplication; Reordering and in-order delivery; Out-of-order delivery; and Duplicate discarding.

The main services and functions of SDAP 201 or SDAP 211 include: Mapping between a QoS flow and a data radio bearer; and Marking QoS Flow ID (QFI) in both downlink and uplink packets. A single protocol entity of SDAP may be configured for each individual PDU session.

As shown in FIG. 2B, the protocol stack of the control plane of the Uu interface (between the UE 125 and the gNB 115) includes PHY layer (layer 1), and MAC, RLC and PDCP sublayers of layer 2 as described above and in addition, the RRC 206 sublayer and RRC 216 sublayer. The main services and functions of the RRC 206 sublayer and the RRC 216 sublayer over the Uu interface include: Broadcast of System Information related to AS and NAS; Paging initiated by 5GC or NG-RAN; Establishment, maintenance and release of an RRC connection between the UE and NG-RAN (including Addition, modification and release of carrier aggregation; and Addition, modification and release of Dual Connectivity in NR or between E-UTRA and NR); Security functions including key management; Establishment, configuration, maintenance and release of SRBs and DRBs; Mobility functions (including Handover and context transfer; UE cell selection and reselection and control of cell selection and reselection; and Inter-RAT mobility); QoS management functions; UE measurement reporting and control of the reporting; Detection of and recovery from radio link failure; and NAS message transfer to/from NAS from/to UE. The NAS 207 and NAS 227 layer is a control protocol (terminated in AMF on the network side) that performs the functions such as authentication, mobility management, security control, etc.

The sidelink specific services and functions of the RRC sublayer over the Uu interface include: Configuration of sidelink resource allocation via system information or dedicated signaling; Reporting of UE sidelink information; Measurement configuration and reporting related to sidelink; and Reporting of UE assistance information for SL traffic pattern(s).

FIG. 3A, FIG. 3B and FIG. 3C show example mappings between logical channels and transport channels in downlink, uplink and sidelink, respectively, according to some aspects of some of various exemplary embodiments of the present disclosure. Different kinds of data transfer services may be offered by MAC. Each logical channel type may be defined by what type of information is transferred. Logical channels may be classified into two groups: Control Channels and Traffic Channels. Control channels may be used for the transfer of control plane information only. The Broadcast Control Channel (BCCH) is a downlink channel for broadcasting system control information. The Paging Control Channel (PCCH) is a downlink channel that carries paging messages. The Common Control Channel (CCCH) is channel for transmitting control information between UEs and network. This channel may be used for UEs having no RRC connection with the network. The Dedicated Control Channel (DCCH) is a point-to-point bi-directional channel that transmits dedicated control information between a UE and the network and may be used by UEs having an RRC connection. Traffic channels may be used for the transfer of user plane information only. The Dedicated Traffic Channel (DTCH) is a point-to-point channel, dedicated to one UE, for the transfer of user information. A DTCH may exist in both uplink and downlink. Sidelink Control Channel (SCCH) is a sidelink channel for transmitting control information (e.g., PC5-RRC and PC5-S messages) from one UE to other UE(s). Sidelink Traffic Channel (STCH) is a sidelink channel for transmitting user information from one UE to other UE(s). Sidelink Broadcast Control Channel (SBCCH) is a sidelink channel for broadcasting sidelink system information from one UE to other UE(s).

The downlink transport channel types include Broadcast Channel (BCH), Downlink Shared Channel (DL-SCH), and Paging Channel (PCH). The BCH may be characterized by: fixed, pre-defined transport format; and requirement to be broadcast in the entire coverage area of the cell, either as a single message or by beamforming different BCH instances. The DL-SCH may be characterized by: support for HARQ; support for dynamic link adaptation by varying the modulation, coding and transmit power; possibility to be broadcast in the entire cell; possibility to use beamforming; support for both dynamic and semi-static resource allocation; and the support for UE Discontinuous Reception (DRX) to enable UE power saving. The DL-SCH may be characterized by: support for HARQ; support for dynamic link adaptation by varying the modulation, coding and transmit power; possibility to be broadcast in the entire cell; possibility to use beamforming; support for both dynamic and semi-static resource allocation; support for UE discontinuous reception (DRX) to enable UE power saving. The PCH may be characterized by: support for UE discontinuous reception (DRX) to enable UE power saving (DRX cycle is indicated by the network to the UE); requirement to be broadcast in the entire coverage area of the cell, either as a single message or by beamforming different BCH instances; mapped to physical resources which can be used dynamically also for traffic/other control channels.

In downlink, the following connections between logical channels and transport channels may exist: BCCH may be mapped to BCH; BCCH may be mapped to DL-SCH; PCCH may be mapped to PCH; CCCH may be mapped to DL-SCH; DCCH may be mapped to DL-SCH; and DTCH may be mapped to DL-SCH.

The uplink transport channel types include Uplink Shared Channel (UL-SCH) and Random Access Channel(s) (RACH). The UL-SCH may be characterized by possibility to use beamforming; support for dynamic link adaptation by varying the transmit power and potentially modulation and coding; support for HARQ; support for both dynamic and semi-static resource allocation. The RACH may be characterized by limited control information; and collision risk.

In Uplink, the following connections between logical channels and transport channels may exist: CCCH may be mapped to UL-SCH; DCCH may be mapped to UL-SCH; and DTCH may be mapped to UL-SCH.

The sidelink transport channel types include: Sidelink broadcast channel (SL-BCH) and Sidelink shared channel (SL-SCH). The SL-BCH may be characterized by pre-defined transport format. The SL-SCH may be characterized by support for unicast transmission, groupcast transmission and broadcast transmission; support for both UE autonomous resource selection and scheduled resource allocation by NG-RAN; support for both dynamic and semi-static resource allocation when UE is allocated resources by the NG-RAN; support for HARQ; and support for dynamic link adaptation by varying the transmit power, modulation and coding.

In the sidelink, the following connections between logical channels and transport channels may exist: SCCH may be mapped to SL-SCH; STCH may be mapped to SL-SCH; and SBCCH may be mapped to SL-BCH.

Figures 4A, 4B, 4C:
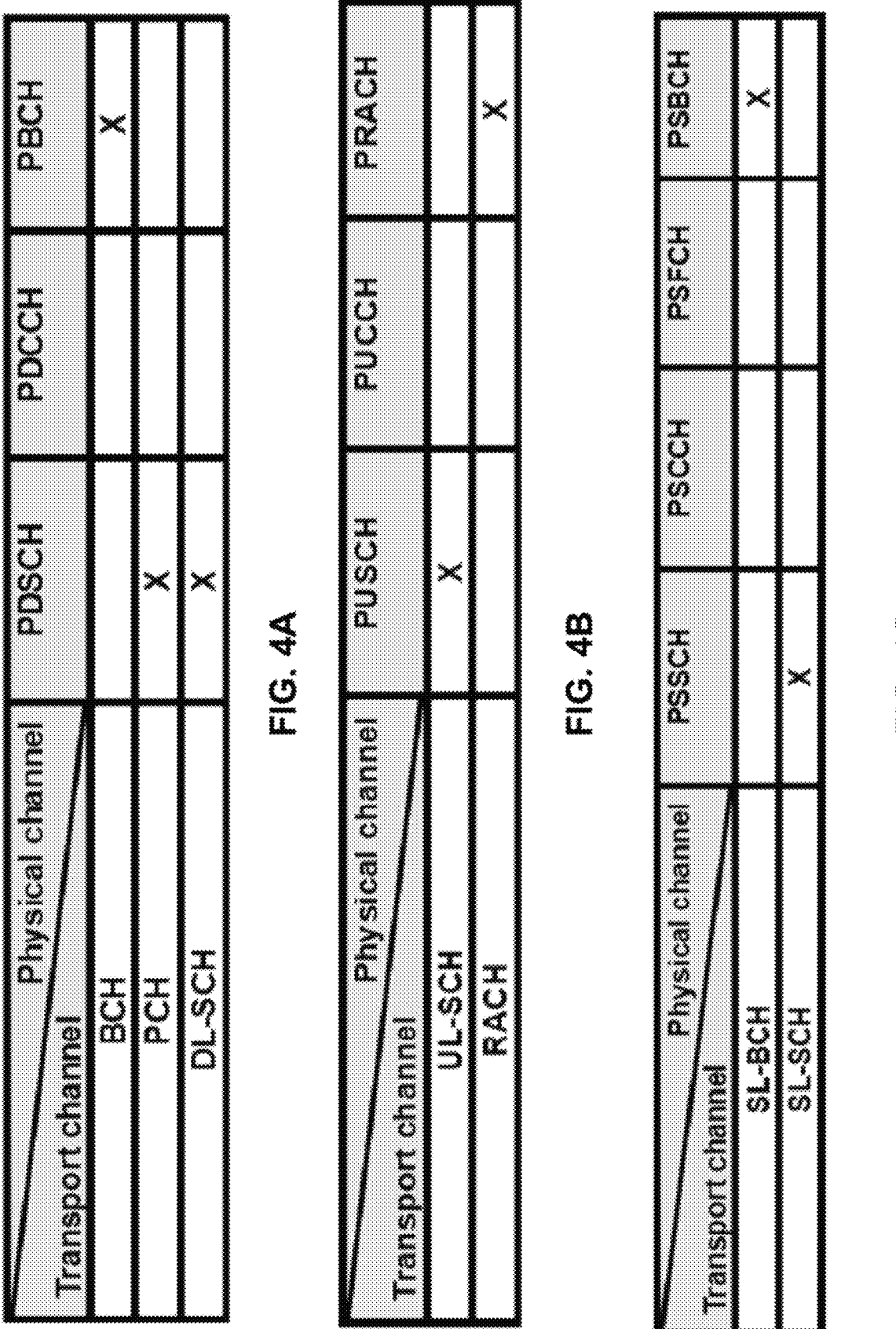
FIG. 4A, FIG. 4B and FIG. 4C show example mappings between transport channels and physical channels in downlink, uplink and sidelink, respectively, according to some aspects of some of various exemplary embodiments of the present disclosure.

FIG. 4A, FIG. 4B and FIG. 4C show example mappings between transport channels and physical channels in down-link, uplink and sidelink, respectively, according to some aspects of some of various exemplary embodiments of the present disclosure. The physical channels in downlink include Physical Downlink Shared Channel (PDSCH), Physical Downlink Control Channel (PDCCH) and Physical Broadcast Channel (PBCH). The PCH and DL-SCH transport channels are mapped to the PDSCH. The BCH transport channel is mapped to the PBCH. A transport channel is not mapped to the PDCCH but Downlink Control Information (DCI) is transmitted via the PDCCH.

The physical channels in the uplink include Physical Uplink Shared Channel (PUSCH), Physical Uplink Control Channel (PUCCH) and Physical Random Access Channel (PRACH). The UL-SCH transport channel may be mapped to the PUSCH and the RACH transport channel may be mapped to the PRACH. A transport channel is not mapped to the PUCCH but Uplink Control Information (UCI) is transmitted via the PUCCH.

The physical channels in the sidelink include Physical Sidelink Shared Channel (PSSCH), Physical Sidelink Control Channel (PSCCH), Physical Sidelink Feedback Channel (PSFCH) and Physical Sidelink Broadcast Channel (PSBCH). The Physical Sidelink Control Channel (PSCCH) may indicate resource and other transmission parameters used by a UE for PSSCH. The Physical Sidelink Shared Channel (PSSCH) may transmit the TBs of data themselves, and control information for HARQ procedures and CSI feedback triggers, etc. At least 6 OFDM symbols within a slot may be used for PSSCH transmission. Physical Sidelink Feedback Channel (PSFCH) may carry the HARQ feedback over the sidelink from a UE which is an intended recipient of a PSSCH transmission to the UE which performed the transmission. PSFCH sequence may be transmitted in one PRB repeated over two OFDM symbols near the end of the sidelink resource in a slot. The SL-SCH transport channel may be mapped to the PSSCH. The SL-BCH may be mapped to PSBCH. No transport channel is mapped to the PSFCH but Sidelink Feedback Control Information (SFCI) may be mapped to the PSFCH. No transport channel is mapped to PSCCH but Sidelink Control Information (SCI) may mapped to the PSCCH.

Figures 5A, 5B, 5C, 5D:
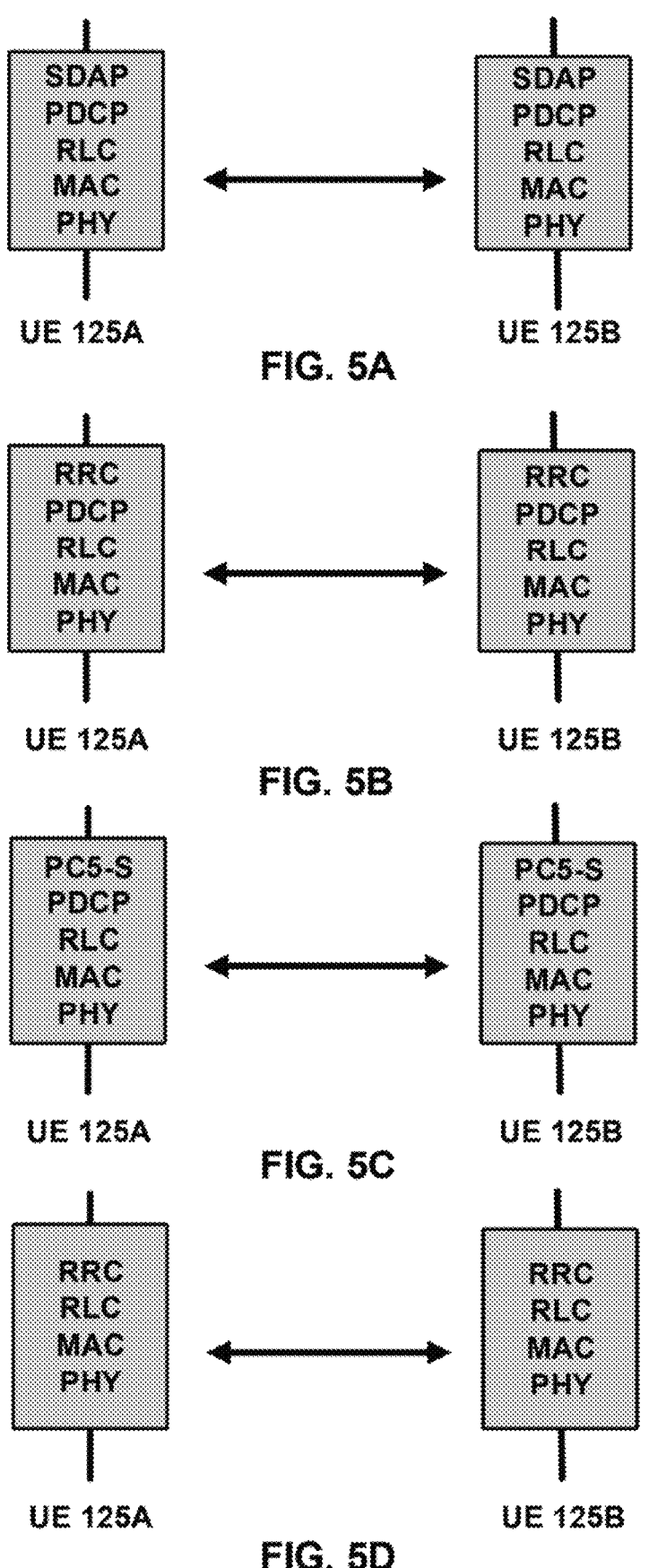
FIG. 5A, FIG. 5B, FIG. 5C and FIG. 5D show examples of radio protocol stacks for NR sidelink communication according to some aspects of some of various exemplary embodiments of the present disclosure.

FIG. 5A, FIG. 5B, FIG. 5C and FIG. 5D show examples of radio protocol stacks for NR sidelink communication according to some aspects of some of various exemplary embodiments of the present disclosure. The AS protocol stack for user plane in the PC5 interface (i.e., for STCH) may consist of SDAP, PDCP, RLC and MAC sublayers, and the physical layer. The protocol stack of user plane is shown in FIG. 5A. The AS protocol stack for SBCCH in the PC5 interface may consist of RRC, RLC, MAC sublayers, and the physical layer as shown below in FIG. 5B. For support of PC5-S protocol, PC5-S is located on top of PDCP, RLC and MAC sublayers, and the physical layer in the control plane protocol stack for SCCH for PC5-S, as shown in FIG. 5C. The AS protocol stack for the control plane for SCCH for RRC in the PC5 interface consists of RRC, PDCP, RLC and MAC sublayers, and the physical layer. The protocol stack of control plane for SCCH for RRC is shown in FIG. 5D.

The Sidelink Radio Bearers (SLRBs) may be categorized into two groups: Sidelink Data Radio Bearers (SL DRB) for user plane data and Sidelink Signaling Radio Bearers (SL SRB) for control plane data. Separate SL SRBs using different SCCHs may be configured for PC5-RRC and PC5-S signaling, respectively.

The MAC sublayer may provide the following services and functions over the PC5 interface: Radio resource selection; Packet filtering; Priority handling between uplink and sidelink transmissions for a given UE; and Sidelink CSI reporting. With logical channel prioritization restrictions in MAC, only sidelink logical channels belonging to the same destination may be multiplexed into a MAC PDU for every unicast, groupcast and broadcast transmission which may be associated to the destination. For packet filtering, a SL-SCH MAC header including portions of both Source Layer-2 ID and a Destination Layer-2 ID may be added to a MAC PDU. The Logical Channel Identifier (LCID) included within a MAC subheader may uniquely identify a logical channel within the scope of the Source Layer-2 ID and Destination Layer-2 ID combination.

The services and functions of the RLC sublayer may be supported for sidelink. Both RLC Unacknowledged Mode (UM) and Acknowledged Mode (AM) may be used in unicast transmission while only UM may be used in group-cast or broadcast transmission. For UM, only unidirectional transmission may be supported for groupcast and broadcast.

The services and functions of the PDCP sublayer for the Uu interface may be supported for sidelink with some restrictions: Out-of-order delivery may be supported only for unicast transmission; and Duplication may not be supported over the PC5 interface.

The SDAP sublayer may provide the following service and function over the PC5 interface: Mapping between a QoS flow and a sidelink data radio bearer. There may be one SDAP entity per destination for one of unicast, groupcast and broadcast which is associated to the destination.

The RRC sublayer may provide the following services and functions over the PC5 interface: Transfer of a PC5-RRC message between peer UEs; Maintenance and release of a PC5-RRC connection between two UEs; and Detection of sidelink radio link failure for a PC5-RRC connection based on indication from MAC or RLC. A PC5-RRC connection may be a logical connection between two UEs for a pair of Source and Destination Layer-2 IDs which may be considered to be established after a corresponding PC5 unicast link is established. There may be one-to-one correspondence between the PC5-RRC connection and the PC5 unicast link. A UE may have multiple PC5-RRC connections with one or more UEs for different pairs of Source and Destination Layer-2 IDs. Separate PC5-RRC procedures and messages may be used for a UE to transfer UE capability and sidelink configuration including SL-DRB configuration to the peer UE. Both peer UEs may exchange their own UE capability and sidelink configuration using separate bi-directional procedures in both sidelink directions.

FIG. 6 shows example physical signals in downlink, uplink and sidelink according to some aspects of some of various exemplary embodiments of the present disclosure. The Demodulation Reference Signal (DM-RS) may be used in downlink, uplink and sidelink and may be used for channel estimation. DM-RS is a UE-specific reference signal and may be transmitted together with a physical channel in downlink, uplink or sidelink and may be used for channel estimation and coherent detection of the physical channel. The Phase Tracking Reference Signal (PT-RS) may be used in downlink, uplink and sidelink and may be used for tracking the phase and mitigating the performance loss due to phase noise. The PT-RS may be used mainly to estimate and minimize the effect of Common Phase Error (CPE) on system performance. Due to the phase noise properties, PT-RS signal may have a low density in the frequency domain and a high density in the time domain. PT-RS may occur in combination with DM-RS and when the network has configured PT-RS to be present. The Positioning Reference Signal (PRS) may be used in downlink for positioning using different positioning techniques. PRS may be used to measure the delays of the downlink transmissions by correlating the received signal from the base station with a local replica in the receiver. The Channel State Information Reference Signal (CSI-RS) may be used in downlink and sidelink. CSI-RS may be used for channel state estimation, Reference Signal Received Power (RSRP) measurement for mobility and beam management, time/frequency tracking for demodulation among other uses. CSI-RS may be configured UE-specifically but multiple users may share the same CSI-RS resource. The UE may determine CSI reports and transit them in the uplink to the base station using PUCCH or PUSCH. The CSI report may be carried in a sidelink MAC CE. The Primary Synchronization Signal (PSS) and the Secondary Synchronization Signal (SSS) may be used for radio fame synchronization. The PSS and SSS may be used for the cell search procedure during the initial attach or for mobility purposes. The Sounding Reference Signal (SRS) may be used in uplink for uplink channel estimation. Similar to CSI-RS, the SRS may serve as QCL reference for other physical channels such that they can be configured and transmitted quasi-collocated with SRS. The Sidelink PSS (S-PSS) and Sidelink SSS (S-SSS) may be used in sidelink for sidelink synchronization.

Figure 7:
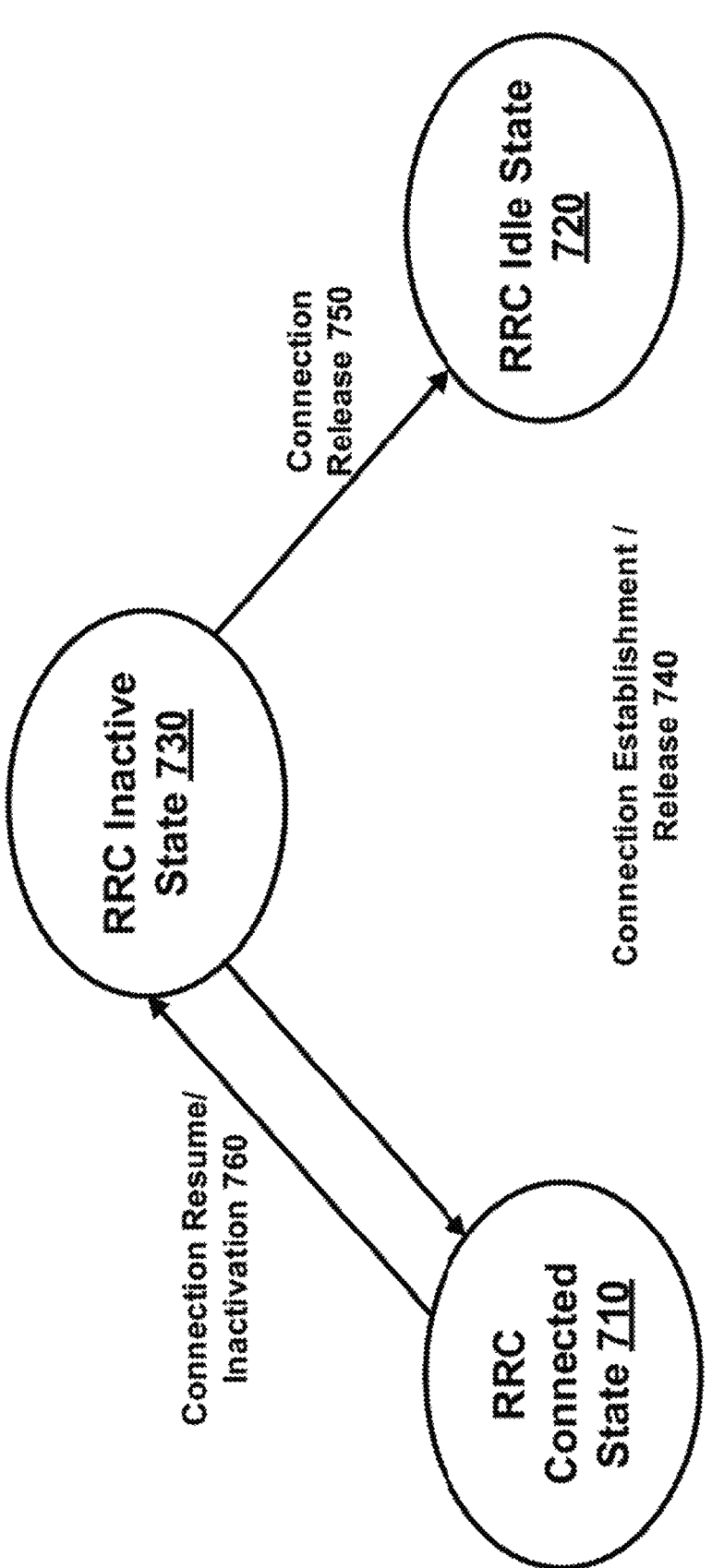
FIG. 7 shows examples of Radio Resource Control (RRC) states and transitioning between different RRC states according to some aspects of some of various exemplary embodiments of the present disclosure.

FIG. 7 shows examples of Radio Resource Control (RRC) states and transitioning between different RRC states according to some aspects of some of various exemplary embodiments of the present disclosure. A UE may be in one of three RRC states: RRC Connected State 710, RRC Idle State 720 and RRC Inactive state 730. After power up, the UE may be in RRC Idle state 720 and the UE may establish connection with the network using initial access and via an RRC connection establishment procedure to perform data transfer and/or to make/receive voice calls. Once RRC connection is established, the UE may be in RRC Connected State 710. The UE may transits from the RRC Idle state 720 to the RRC connected state 710 or from the RRC Connected State 710 to the RRC Idle state 720 using the RRC connection Establishment/Release procedures 740.

To reduce the signaling load and the latency resulting from frequent transitioning from the RRC Connected State 710 to the RRC Idle State 720 when the UE transmits frequent small data, the RRC Inactive State 730 may be used. In the RRC Inactive State 730, the AS context may be stored by both UE and gNB. This may result in faster state transition from the RRC Inactive State 730 to RRC Connected State 710. The UE may transition from the RRC Inactive State 730 to the RRC Connected State 710 or from the RRC Connected State 710 to the RRC Inactive State 730 using the RRC Connection Resume/Inactivation procedures 760. The UE may transition from the RRC Inactive State 730 to RRC Idle State 720 using an RRC Connection Release procedure 750.

Figure 8:
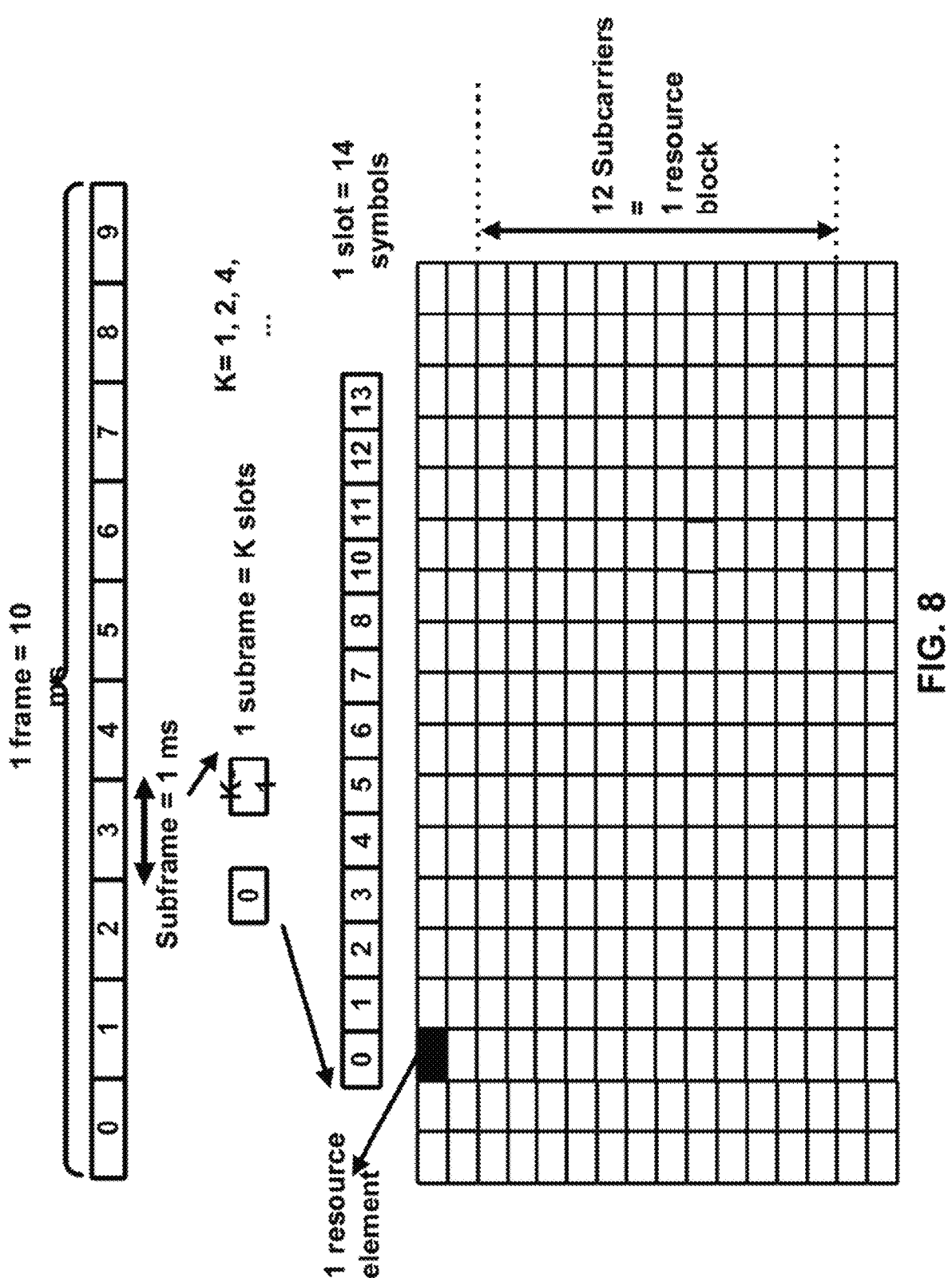
FIG. 8 shows example frame structure and physical resources according to some aspects of some of various exemplary embodiments of the present disclosure.

FIG. 8 shows example frame structure and physical resources according to some aspects of some of various exemplary embodiments of the present disclosure. The downlink or uplink or sidelink transmissions may be organized into frames with 10 ms duration, consisting of ten 1 ms subframes. Each subframe may consist of 1, 2, 4, . . . slots, wherein the number of slots per subframe may depend of the subcarrier spacing of the carrier on which the transmission takes place. The slot duration may be 14 symbols with Normal Cyclic Prefix (CP) and 12 symbols with Extended CP and may scale in time as a function of the used subcarrier spacing so that there is an integer number of slots in a subframe. FIG. 8 shows a resource grid in time and frequency domain. Each element of the resource grid, comprising one symbol in time and one subcarrier in frequency, is referred to as a Resource Element (RE). A Resource Block (RB) may be defined as 12 consecutive subcarriers in the frequency domain.

In some examples and with non-slot-based scheduling, the transmission of a packet may occur over a portion of a slot, for example during 2, 4 or 7 OFDM symbols which may also be referred to as mini-slots. The mini-slots may be used for low latency applications such as URLLC and operation in unlicensed bands. In some embodiments, the mini-slots may also be used for fast flexible scheduling of services (e.g., pre-emption of URLLC over eMBB).

Figure 9:
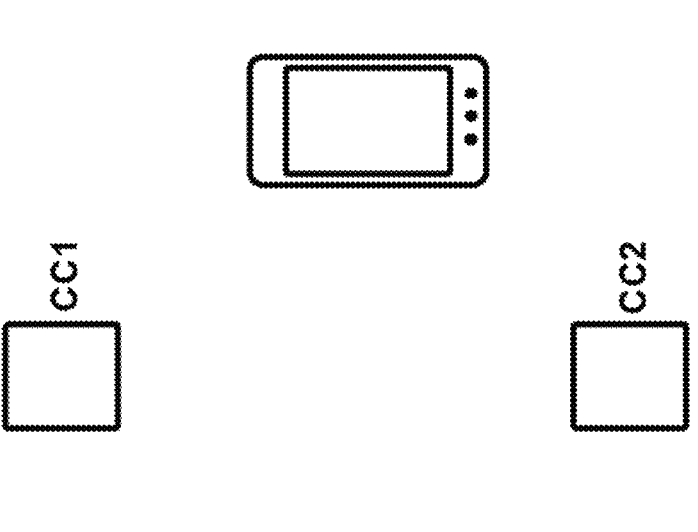
FIG. 9 shows example component carrier configurations in different carrier aggregation scenarios according to some aspects of some of various exemplary embodiments of the present disclosure.
Figure 9:
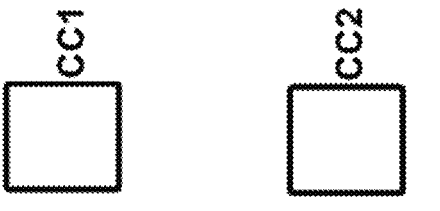
Figure 9:
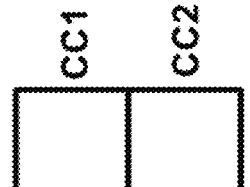
Figure 9:
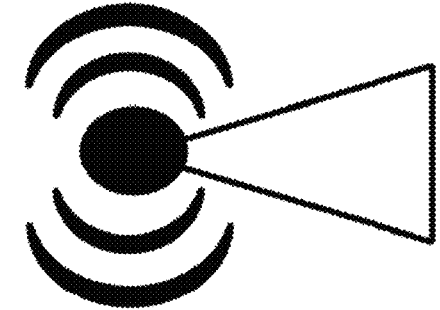

FIG. 9 shows example component carrier configurations in different carrier aggregation scenarios according to some aspects of some of various exemplary embodiments of the present disclosure. In Carrier Aggregation (CA), two or more Component Carriers (CCs) may be aggregated. A UE may simultaneously receive or transmit on one or multiple CCs depending on its capabilities. CA may be supported for both contiguous and non-contiguous CCs in the same band or on different bands as shown in FIG. 9. A gNB and the UE may communicate using a serving cell. A serving cell may be associated at least with one downlink CC (e.g., may be associated only with one downlink CC or may be associated with a downlink CC and an uplink CC). A serving cell may be a Primary Cell (PCell) or a Secondary cCell (SCell).

A UE may adjust the timing of its uplink transmissions using an uplink timing control procedure. A Timing Advance (TA) may be used to adjust the uplink frame timing relative to the downlink frame timing. The gNB may determine the desired Timing Advance setting and provides that to the UE. The UE may use the provided TA to determine its uplink transmit timing relative to the UE's observed downlink receive timing.

In the RRC Connected state, the gNB may be responsible for maintaining the timing advance to keep the L1 synchronized. Serving cells having uplink to which the same timing advance applies and using the same timing reference cell are grouped in a Timing Advance Group (TAG). A TAG may contain at least one serving cell with configured uplink. The mapping of a serving cell to a TAG may be configured by RRC. For the primary TAG, the UE may use the PCell as timing reference cell, except with shared spectrum channel access where an SCell may also be used as timing reference cell in certain cases. In a secondary TAG, the UE may use any of the activated SCells of this TAG as a timing reference cell and may not change it unless necessary.

Timing advance updates may be signaled by the gNB to the UE via MAC CE commands. Such commands may restart a TAG-specific timer which may indicate whether the L1 can be synchronized or not: when the timer is running, the L1 may be considered synchronized, otherwise, the L1 may be considered non-synchronized (in which case uplink transmission may only take place on PRACH).

A UE with single timing advance capability for CA may simultaneously receive and/or transmit on multiple CCs corresponding to multiple serving cells sharing the same timing advance (multiple serving cells grouped in one TAG). A UE with multiple timing advance capability for CA may simultaneously receive and/or transmit on multiple CCs corresponding to multiple serving cells with different timing advances (multiple serving cells grouped in multiple TAGs). The NG-RAN may ensure that each TAG contains at least one serving cell. A non-CA capable UE may receive on a single CC and may transmit on a single CC corresponding to one serving cell only (one serving cell in one TAG).

The multi-carrier nature of the physical layer in case of CA may be exposed to the MAC layer and one HARQ entity may be required per serving cell. When CA is configured, the UE may have one RRC connection with the network. At RRC connection establishment/re-establishment/handover, one serving cell (e.g., the PCell) may provide the NAS mobility information. Depending on UE capabilities, SCells may be configured to form together with the PCell a set of serving cells. The configured set of serving cells for a UE may consist of one PCell and one or more SCells. The reconfiguration, addition and removal of SCells may be performed by RRC.

In a dual connectivity scenario, a UE may be configured with a plurality of cells comprising a Master Cell Group (MCG) for communications with a master base station, a Secondary Cell Group (SCG) for communications with a secondary base station, and two MAC entities: one MAC entity and for the MCG for communications with the master base station and one MAC entity for the SCG for communications with the secondary base station.

Figure 10:
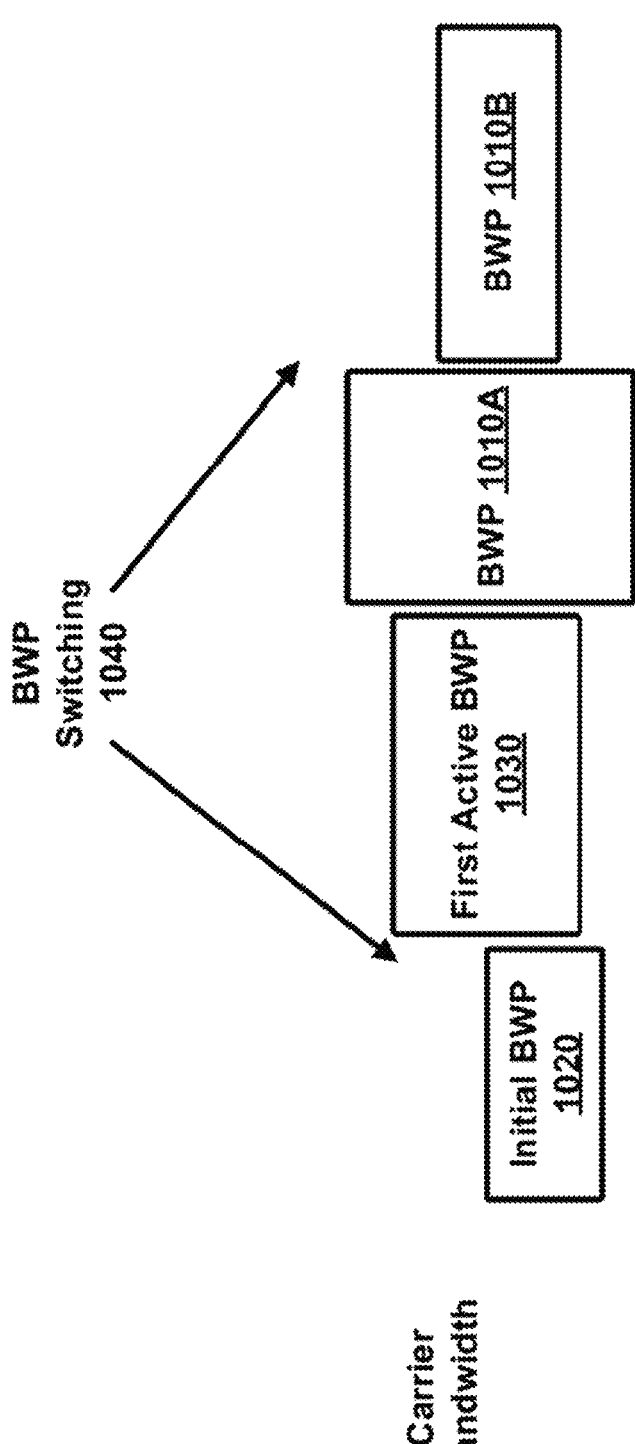
FIG. 10 shows example bandwidth part configuration and switching according to some aspects of some of various exemplary embodiments of the present disclosure.

FIG. 10 shows example bandwidth part configuration and switching according to some aspects of some of various exemplary embodiments of the present disclosure. The UE may be configured with one or more Bandwidth Parts (BWPs) 1010 on a given component carrier. In some examples, one of the one or more bandwidth parts may be active at a time. The active bandwidth part may define the UE's operating bandwidth within the cell's operating bandwidth. For initial access, and until the UE's configuration in a cell is received, initial bandwidth part 1020 determined from system information may be used. With Bandwidth Adaptation (BA), for example through BWP switching 1040, the receive and transmit bandwidth of a UE may not be as large as the bandwidth of the cell and may be adjusted. For example, the width may be ordered to change (e.g. to shrink during period of low activity to save power); the location may move in the frequency domain (e.g. to increase scheduling flexibility); and the subcarrier spacing may be ordered to change (e.g. to allow different services). The first active BWP 1030 may be the active BWP upon RRC (re-)configuration for a PCell or activation of an SCell.

For a downlink BWP or uplink BWP in a set of downlink BWPs or uplink BWPs, respectively, the UE may be provided the following configuration parameters: a Subcarrier Spacing (SCS); a cyclic prefix; a common RB and a number of contiguous RBs; an index in the set of downlink BWPs or uplink BWPs by respective BWP-Id; a set of BWP-common and a set of BWP-dedicated parameters. A BWP may be associated with an OFDM numerology according to the configured subcarrier spacing and cyclic prefix for the BWP. For a serving cell, a UE may be provided by a default downlink BWP among the configured downlink BWPs. If a UE is not provided a default downlink BWP, the default downlink BWP may be the initial downlink BWP.

A downlink BWP may be associated with a BWP inactivity timer. If the BWP inactivity timer associated with the active downlink BWP expires and if the default downlink BWP is configured, the UE may perform BWP switching to the default BWP. If the BWP inactivity timer associated with the active downlink BWP expires and if the default downlink BWP is not configured, the UE may perform BWP switching to the initial downlink BWP.

Figure 11:
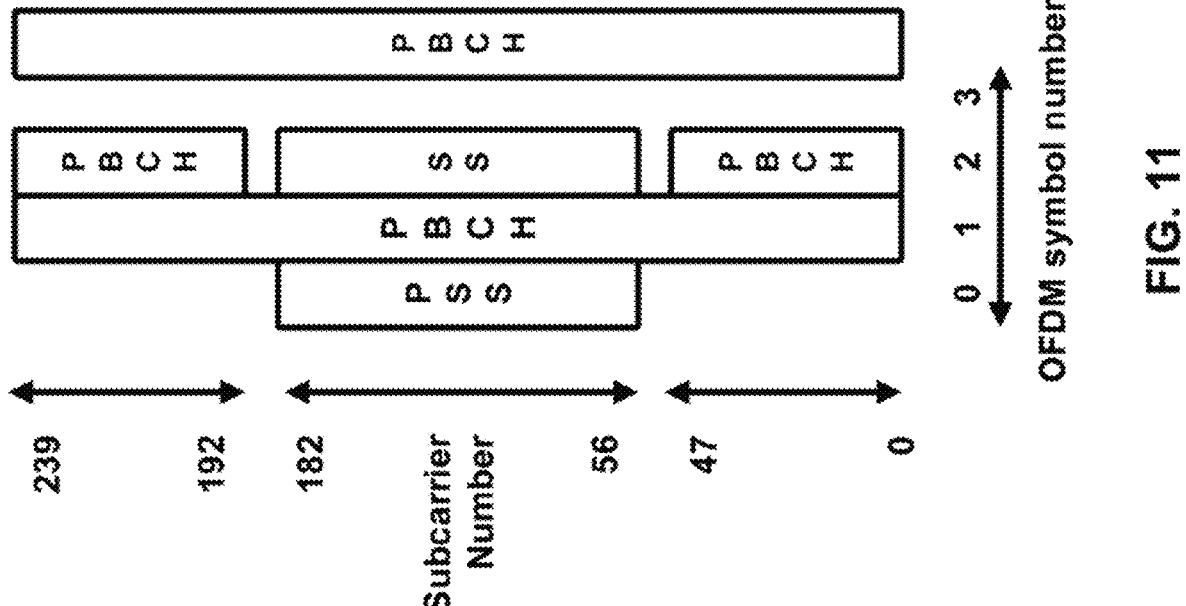
FIG. 11 shows example four-step contention-based and contention-free random access processes according to some aspects of some of various exemplary embodiments of the present disclosure.

FIG. 11 shows example time and frequency structure of Synchronization Signal and Physical Broadcast Channel (PBCH) Block (SSB) according to some aspects of some of various exemplary embodiments of the present disclosure. The SS/PBCH Block (SSB) may consist of Primary and Secondary Synchronization Signals (PSS, SSS), each occupying 1 symbol and 127 subcarriers (e.g., subcarrier numbers 56 to 182 in FIG. 13), and PBCH spanning across 3 OFDM symbols and 240 subcarriers, but on one symbol leaving an unused part in the middle for SSS as show in FIG. 13. The possible time locations of SSBs within a half-frame may be determined by sub-carrier spacing and the periodicity of the half-frames, where SSBs are transmitted, may be configured by the network. During a half-frame, different SSBs may be transmitted in different spatial directions (i.e. using different beams, spanning the coverage area of a cell).

The PBCH may be used to carry Master Information Block (MIB) used by a UE during cell search and initial access procedures. The UE may first decode PBCH/MIB to receive other system information. The MIB may provide the UE with parameters required to acquire System Information Block 1 (SIB1), more specifically, information required for monitoring of PDCCH for scheduling PDSCH that carries SIB1. In addition, MIB may indicate cell barred status information. The MIB and SIB1 may be collectively referred to as the minimum system information (SI) and SIB1 may be referred to as remaining minimum system information (RMSI). The other system information blocks (SIBs) (e.g., SIB2, SIB3, . . . , SIB10 and SIBpos) may be referred to as Other SI (OSI). The OSI may be periodically broadcast on DL-SCH, broadcast on-demand on DL-SCH (e.g., upon request from UEs in RRC Idle State, RRC Inactive State, or RRC connected State), or sent in a dedicated manner on DL-SCH to UEs in RRC Connected State (e.g., upon request, if configured by the network, from UEs in RRC Connected State or when the UE has an active BWP with no common search space configured).

Figures 12A, 12B:
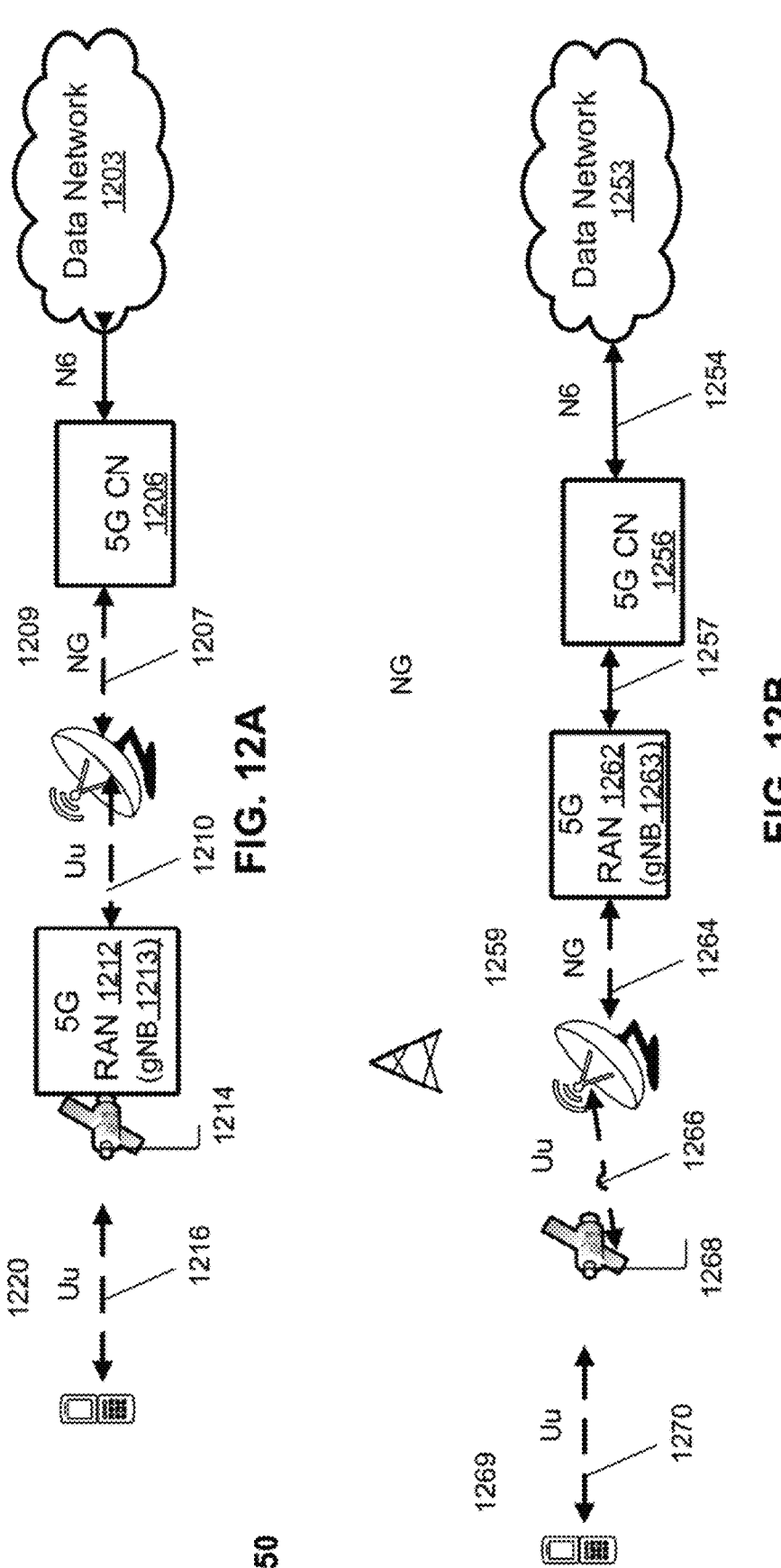
FIG. 12A shows example of non-transparent Non-Terrestrial Wireless Networks (NTN) according to some aspects of some of various exemplary embodiments of the present disclosure.
FIG. 12B shows example of transparent Non-Terrestrial Wireless Networks (NTN) according to some aspects of some of various exemplary embodiments of the present disclosure.

FIGS. 12A and 12B show example of non-transparent 1200 and transparent 1250 mobile communication Non-Terrestrial Network (NTN), respectively, according to some aspects of some of various exemplary embodiments of the present disclosure. The data networks 1203 (FIG. 12A), 1253 (FIG. 12B) are connected to 5G-CN 1206 (FIG. 12A), 1256 (FIG. 12B) via links N6 1254. The networks 1200, 1250 may improve network access for three categories: Provide service where the service is infeasible through terrestrial networks; Offload traffic from the terrestrial network; provide the NTN availability in scenarios that leads to temporary outage or destruction of a terrestrial network.

In the non-transparent architecture 1200, satellite 1214 may include full or part of 5G RAN 1212 to transmit/receive a "Satellite friendly" signal 1216 to/from UE 1220. The 5G Ran 1212 may include a base station gNB 1213. The Uu interface 1216 may be used between the UE 1220, and satellite 1214. Gateway 1209 may forward the signals 1210, from 5G-CN 1206 to 5G RAN 1212 or vice versa. The radio link NG may be used between 5G-CN 1206 and the gateway 1209. Inter-Satellite Links (ISLs) may be used as transport links between NTN platform 1213, 1212.

In the transparent architecture 1250, satellite 1268 may relay a "Satellite friendly" signal 1264 between 5G RAN 1262 and UE 1270. The 5G RAN 1263 may include a base station gNB 1263. The Uu interface 1270 may be used 1266, 1264 between the UE 1269, and the satellite 1268. Gateway 1259 may forward the signals from 5G-RAN 1262 to the satellite 1268 or vice versa. The radio link NG may be used 1207 (FIG. 12A), 1264 (FIG. 12B) between 1257 5G-CN 1206, 1256, 5G-RAN 1212, 1262, and the gateway 1259. Inter-Satellite Links (ISLs) may be used as transport links between NTN platform 1213, 1212.

In some examples, the NTN networks 1203, 1253 may be used to provide eMBB service in un/under served areas and moving platform (e.g., vessels, aircrafts). Furthermore, the networks 1203, 1253 may provide a unique platform to combine terrestrial and NTN networks. In some scenarios, the networks 1203, 1253, may be exploited to offload traffic from the 5G terrestrial networks (e.g., network 100) to deliver broadcast and multicast service or public safety messages to UEs in home premises or on-board moving platform.

In some other examples, the NTN 1200, 1250 may be used to provide mMTC service for both wide and local area IoT services. In the wide-area IoT service, the IoT device may connect to the NTN via a satellite or a gNB. In the case of local area IoT service, the NTN may provide connectivity between the IoT and the 5G-RAN serving IoT devices by gathering information belonging to the groups of sensors deployed under coverage of one or more cell.

In some other examples, the NTN 1200, 1250 may be used for maritime scenarios. The NTN is useful to facilitate communication of 5G-CN with seaborne platform. The NTN 1200, 1250 may be exploited for paging notifications and emergency request (e.g., to inform the location of a vessel in danger to other vessels) to improve maritime safety.

Figure 13:
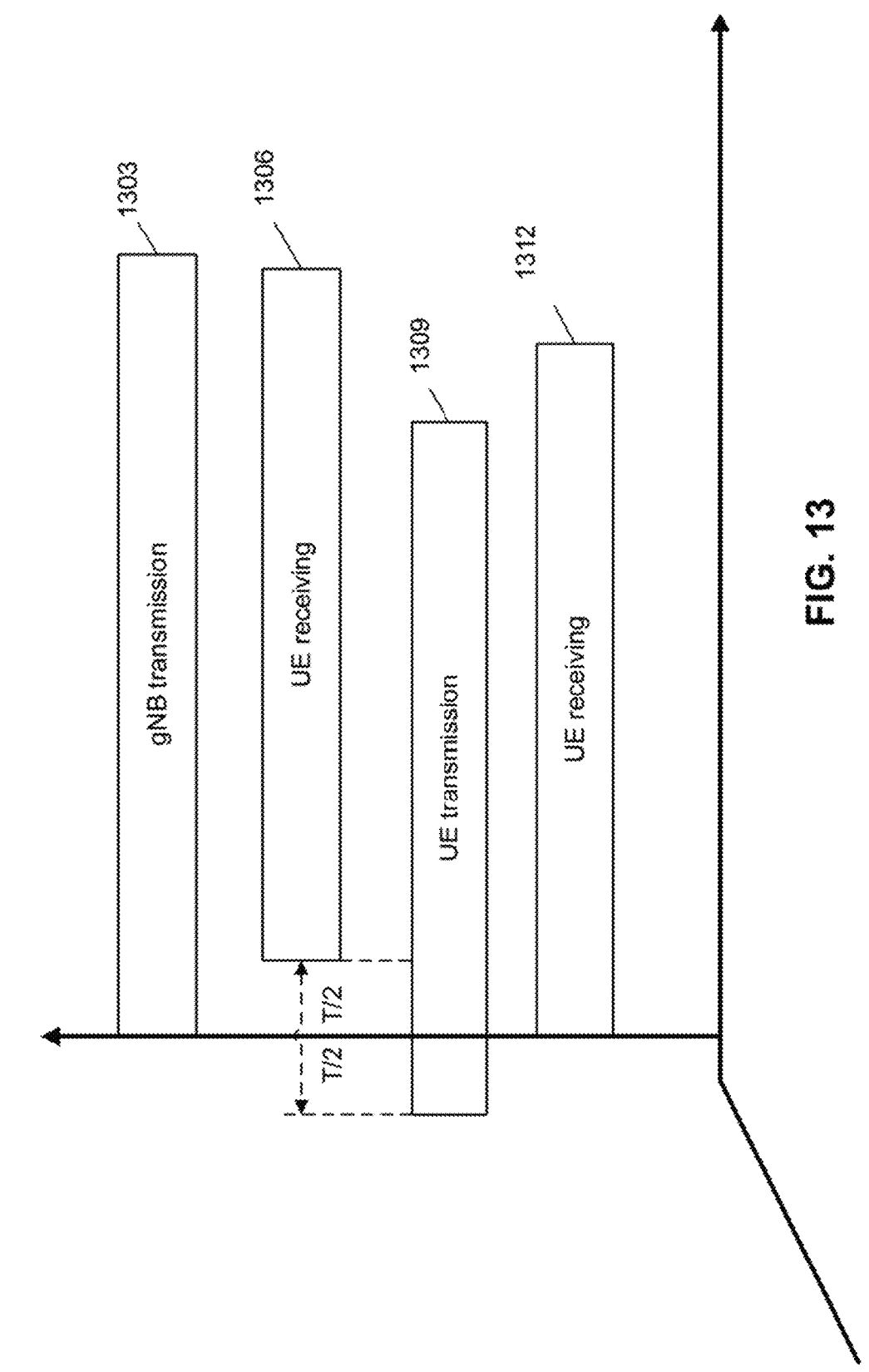
FIG. 13 shows example of Uplink (UL) and Downlink (DL) data transmission and reception according to some aspects of some of various exemplary embodiments of the present disclosure.

FIG. 13 shows example of DL/UL data transmission between a UE and gNB of an NTN network according to some aspects of some of various exemplary embodiments of the present disclosure. As shown, a gNB (e.g. gNB 1213, 1263) may transmit DL frame 1303 to the UE (e.g., UE 1220, 1270). The UE (e.g., UE 1220, 1270) may receive DL frame 1303 after a delay T/2, as shown as frame 1303. The delay T/2 denotes the path propagation delay between a gNB and the UE. In NTNs, the path propagation delay can be long compared to a terrestrial network due to much longer distance between the UE and the satellite. As shown, transmission of UL frame 1309 from the UE to the gNB, may start T before the start of the corresponding received DL frame 1306 at the UE 1312. The T may be referred to Time Advance (TA) between the UE and the gNB.

In an NTN, the high delay drift of individual non-GEO satellites may can be quite predictable because the motion of the satellites follows known paths. The very fast update of the T may be required neither in terrestrial networks, nor in GEO satellite links. In both scenarios, the terminal mobility is dominating the T requirements.

In some examples, the propagation delay adjustment may be performed using a linear scale. Depending on the numerology, the number of TA commands may be well defined and fixed. Specifically, in some scenarios, the UE may measure the propagation delay only one or two times, and performs TA adjustment. This scenario is quite inflexible while using a considerable amount of bandwidth for the signaling. The TA commands may represent a linear scale for TA correction, which may work well in some scenarios when the differences are small and very stable.

Figure 14:
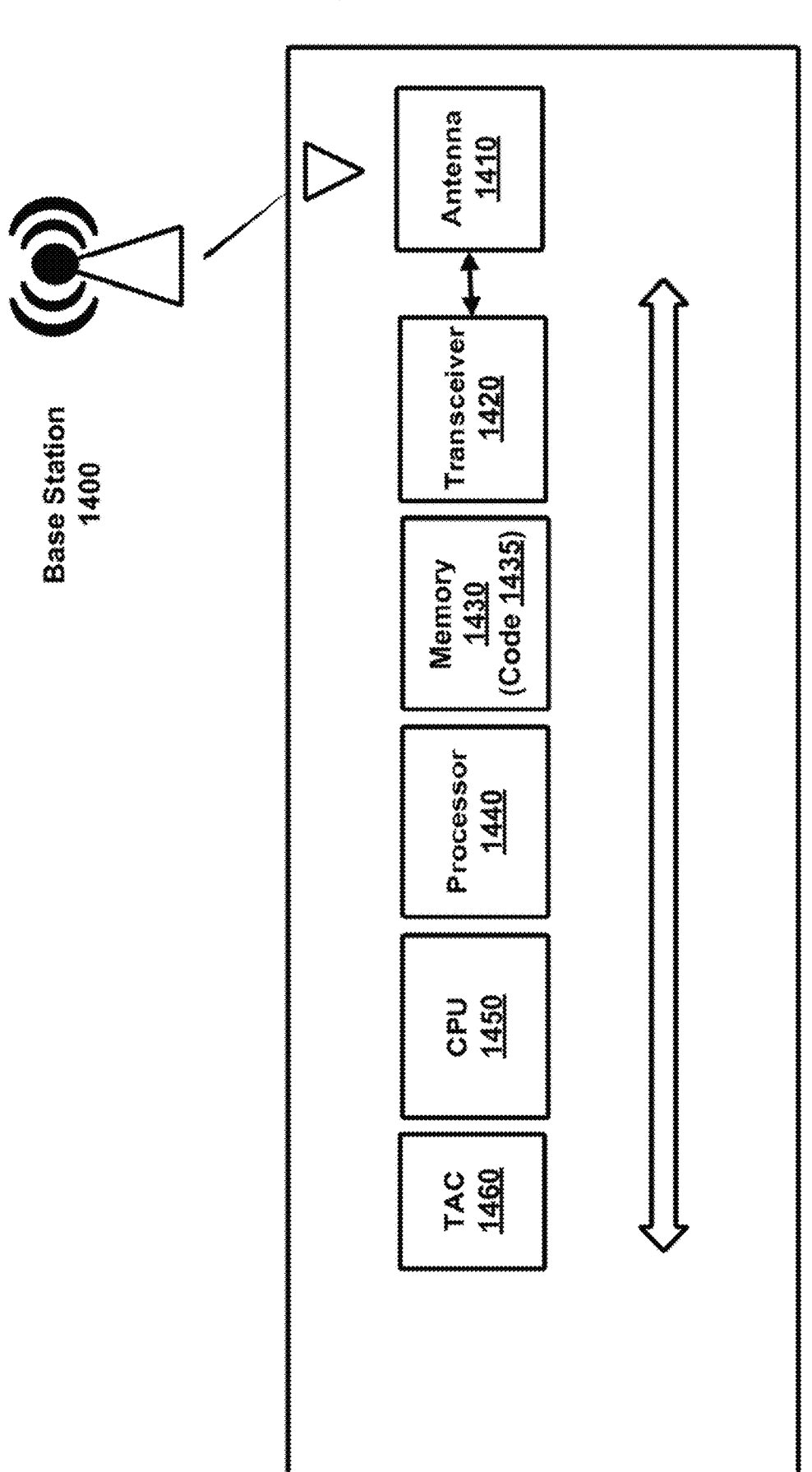
FIG. 14 shows example components of a base station for transmission and/or reception according to some aspects of some of various exemplary embodiments of the present disclosure.

FIG. 14 shows example components of a BS for transmission and/or reception according to some aspects of some of various exemplary embodiments of the present disclosure. All or a subset of blocks and functions in FIG. 14 may be in the BS 1400 (e.g., BS 1213, 1263), and may be performed by the BS 1400. The Antenna 1410 may be used for transmission or reception of electromagnetic signals. The Antenna 1410 may comprise one or more antenna elements and may enable different input-output antenna configurations including Multiple-Input Multiple Output (MIMO) configuration, Multiple-Input Single-Output (MISO) configuration and Single-Input Multiple-Output (SIMO) configuration. In some embodiments, the Antenna 1410 may enable a massive MIMO configuration with tens or hundreds of antenna elements. The Antenna 1410 may enable other multi-antenna techniques such as beamforming.

The transceiver 1420 may communicate bi-directionally, via the Antenna 1410, wireless links as described herein. For example, the transceiver 1420 may represent a wireless transceiver at the UE and may communicate bi-directionally with the wireless transceiver at the base station or vice versa. The transceiver 1420 may include a modem to modulate the packets and provide the modulated packets to the Antennas 1410 for transmission, and to demodulate packets received from the Antennas 1410.

The memory 1430 may include RAM and ROM. The memory 1430 may store computer-readable, computer-executable code 1435 including instructions that, when executed, cause the processor to perform various functions described herein. In some examples, the memory 1430 may contain, among other things, a Basic Input/output System (BIOS) which may control basic hardware or software operation such as the interaction with peripheral components or devices.

The processor 1440 may include a hardware device with processing capability (e.g., a general purpose processor, a DSP, a CPU, a microcontroller, an ASIC, an FPGA, a programmable logic device, a discrete gate or transistor logic component, a discrete hardware component, or any combination thereof). In some examples, the processor 1440 may be configured to operate a memory using a memory controller. In other examples, a memory controller may be integrated into the processor 1440. The processor 1440 may be configured to execute computer-readable instructions stored in a memory (e.g., the memory 1430) to cause the base station 1400 to perform various functions.

The Central Processing Unit (CPU) 1450 may perform basic arithmetic, logic, controlling, and Input/output (I/O) operations specified by the computer instructions in the Memory 1430.

The Time Advancement Correction module 1460 may perform measurement to compute path propagation delay, and transmit TA commands to UEs for TA adjustment.

Figure 15:
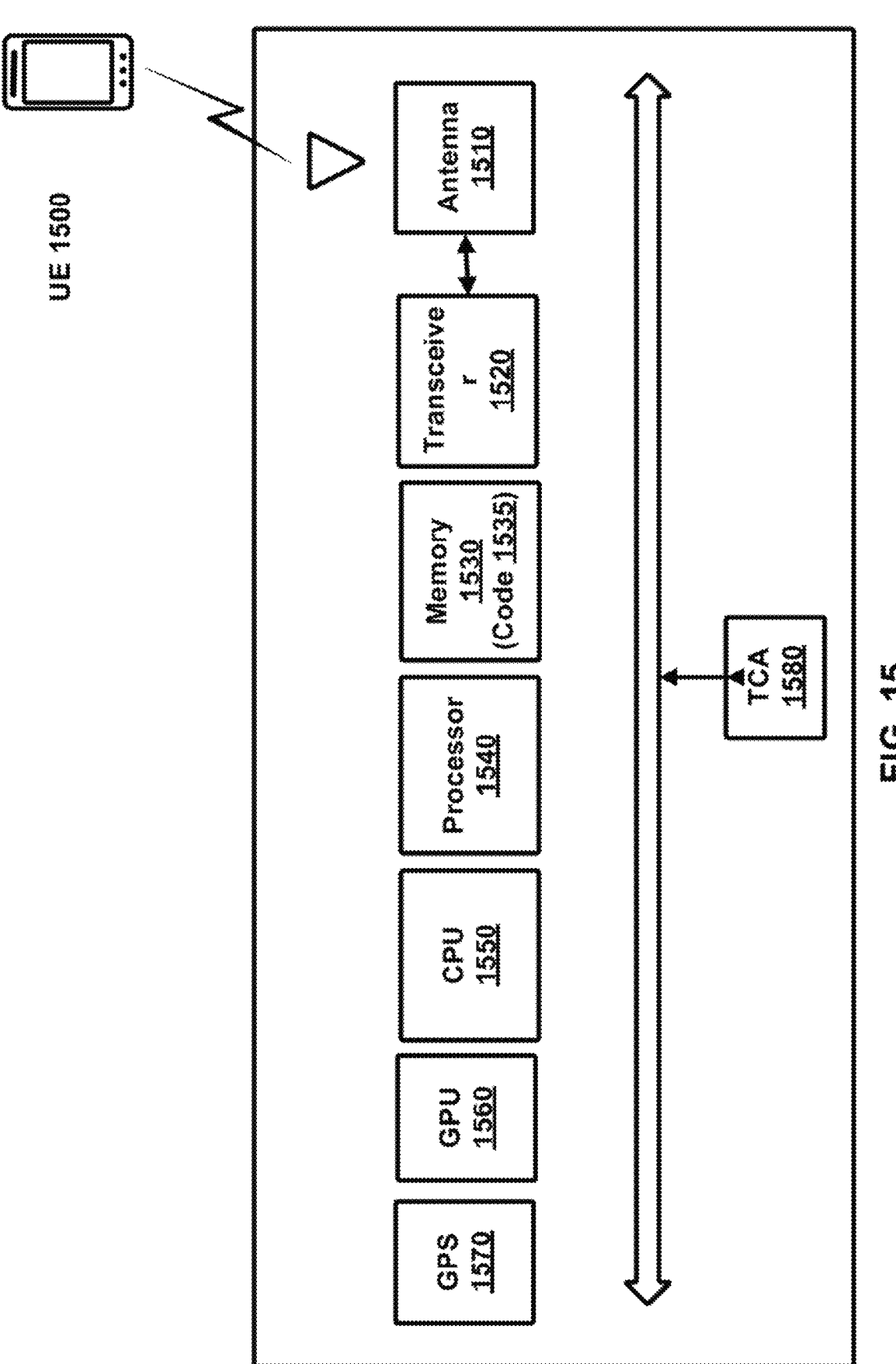
FIG. 15 shows example components of a user equipment for transmission and/or reception according to some aspects of some of various exemplary embodiments of the present disclosure.

FIG. 15 shows example components of a user equipment and/or reception according to some aspects of some of various exemplary embodiments of the present disclosure. All or a subset of blocks and functions in FIG. 15 may be in the user equipment 1500 (e.g., UE 1220, 1270) and may be performed by the user equipment 1500. The Antenna 1510 may be used for transmission or reception of electromagnetic signals. The Antenna 1510 may comprise one or more antenna elements and may enable different input-output antenna configurations including Multiple-Input Multiple Output (MIMO) configuration, Multiple-Input Single-Output (MISO) configuration and Single-Input Multiple-Output (SIMO) configuration. In some embodiments, the Antenna 150 may enable a massive MIMO configuration with tens or hundreds of antenna elements. The Antenna 1510 may enable other multi-antenna techniques such as beamforming. In some examples and depending on the UE 1500 capabilities or the type of UE 1500 (e.g., a low-complexity UE), the UE 1500 may support a single antenna only.

The transceiver 1520 may communicate bi-directionally, via the Antenna 1510, wireless links as described herein. For example, the transceiver 1520 may represent a wireless transceiver at the UE and may communicate bi-directionally with the wireless transceiver at the base station or vice versa. The transceiver 1520 may include a modem to modulate the packets and provide the modulated packets to the Antennas 1510 for transmission, and to demodulate packets received from the Antennas 1510.

The memory 1530 may include RAM and ROM. The memory 1530 may store computer-readable, computer-executable code 1535 including instructions that, when executed, cause the processor to perform various functions described herein. In some examples, the memory 1530 may contain, among other things, a Basic Input/output System (BIOS) which may control basic hardware or software operation such as the interaction with peripheral components or devices.

The processor 1540 may include a hardware device with processing capability (e.g., a general purpose processor, a DSP, a CPU, a microcontroller, an ASIC, an FPGA, a programmable logic device, a discrete gate or transistor logic component, a discrete hardware component, or any combination thereof). In some examples, the processor 1540 may be configured to operate a memory using a memory controller. In other examples, a memory controller may be integrated into the processor 1540. The processor 1540 may be configured to execute computer-readable instructions stored in a memory (e.g., the memory 1530) to cause the UE 1500 or the base station 1505 to perform various functions.

The Central Processing Unit (CPU) 1550 may perform basic arithmetic, logic, controlling, and Input/output (I/O) operations specified by the computer instructions in the Memory 1530. The user equipment 1500 may include additional peripheral components such as a graphics processing unit (GPU) 1560 and a Global Positioning System (GPS) 1570. The GPU 1560 is a specialized circuitry for rapid manipulation and altering of the Memory 1530 for accelerating the processing performance of the user equipment 1500 and/or the base station 1505. The GPS 1570 may be used for enabling location-based services or other services for example based on geographical position of the user equipment 1500.

The trusted connectivity alliance (TCA) module 1580 may include functionality to perform measurement to estimate path propagation delay between the UE (e.g., UE 1220, gNB 1213), and computes TA for transmission of an uplink frame.

Figure 16B:
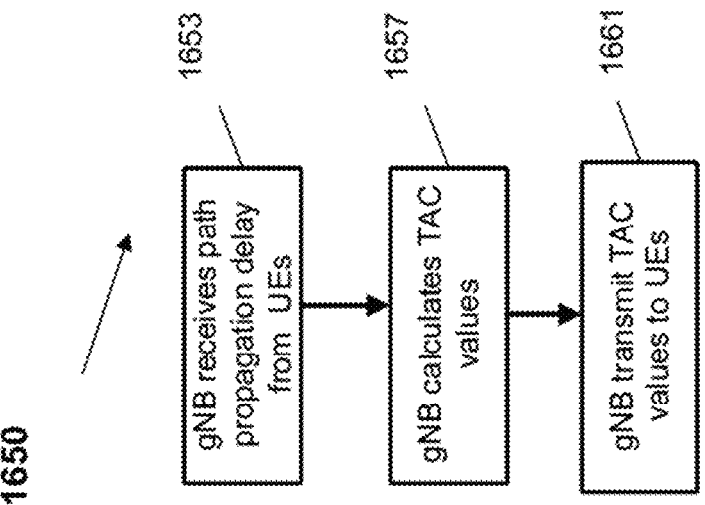
FIG. 16B is flow diagram illustrating a first embodiment of a method of path propagation delay correction performed by a base station according to some aspects of some of various exemplary embodiments of the present disclosure.
Figure 16A:
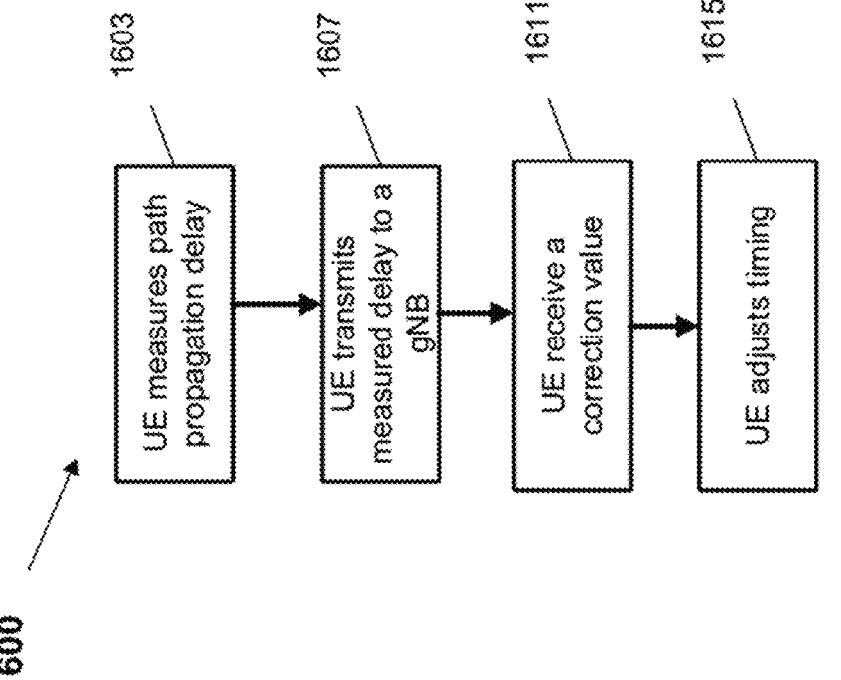
FIG. 16A is flow diagram illustrating a first embodiment of a method of path propagation delay correction performed by a User Equipment (UE) according to some aspects of some of various exemplary embodiments of the present disclosure.

FIG. 16A is a flow diagram of an exemplary method for a UE performing TA alignment process according to some aspects of some of various exemplary embodiments of the present disclosure. The method 1600 is described herein with reference to exemplary networks 1200, 1250.

At step 1603, UE performs measurement to estimate path propagation delay. The path propagation delay may be estimated from measuring DL reference signal (e.g., DM-RS, CSI-RS). In some examples, the path propagation delay measurements may be performed on a regular basis.

At step 1607, the UE transmits the estimated path propagation delay to gNB. The UE may transmit the estimated path propagation delay to the gNB during RACH process via PRACH.

At step 1611, the UE receives a TA correction command from a gNB. The gNB may transmit the TA correction command in Random Access Response (RAA) via PRACH. The TA correction command may indicate the change of the uplink timing relative to the current uplink timing. In RRC connected mode, the gNB mat transmits TA correction command via MAC Control Element (CE) to the UE.

In some examples, the UE may receive receives $T_{dif}$ difference between $T_{target}$ (the desired TA) and $T_{meas}$ (the estimated TA by the UE) from the gNB.

If PUSCH/PUCCH/SRS arrives at the network too early, network may send a TA correction command to UE saying "Transmit your signal a little bit late". If PUSCH/PUCCH/SRS arrives at the network too late, the network may send a TA correction command to the UE saying "Transmit your signal a little bit early".

At step 1615, the UE adjusts its TA for UL transmission according to the TA correction command from gNB. In some examples, the UE may adjust its TA according to $$T_{cor} = cT_{dif}^{n} \qquad (1)$$

where $T_{cor}$ is the TA correction.

The exponent n=1 and multiplier c=1 would lead to a linear dependency, which is the same as using the TA values. Nevertheless, a non-linear dependency would lead to a much better approximation towards the target. As equation (1) shows, the TA correction is computed based on a non-linear function, which leads to a large correction when the difference is large while a very small step may be imposed when the difference is small.

FIG. 16B is a flow diagram of an exemplary method for a gNB performing TAC process according to some aspects of some of various exemplary embodiments of the present disclosure. The method 1650 is described herein with reference to exemplary networks 1200, 1250.

At step 1653, the gNB receives estimated path propagation delays from a UE or a group of UEs. The path propagation delay may be received during RACH process via PRACH.

At step 1657, the gNB calculates the TAC values for the UEs based on the received path propagations delays form the UEs. In some examples the gNB may compute $$T_{dif} = |T_{meas} - T_{target}| \qquad (2)$$

For each UEs.

At step 1661, the gNB transmits TAC values to the UEs. The gNB may transmits TAC values in RAA via PRACH.

It is worth to mention that in the methods 1600 and 1650, the gNB computes the TAC for different UEs, and aligns UL transmissions for the UEs. This in turn may enable the gNB to use multi-user detection algorithms, which can significantly improve the network performance and users experiences. In addition, since the UEs perform the measurements, the gNB load is reduced. In some examples, the measurements may be performed by the UEs in parallel. In some other examples, the measurements may be performed in a distributed scheme by the UEs.

Figure 17B:
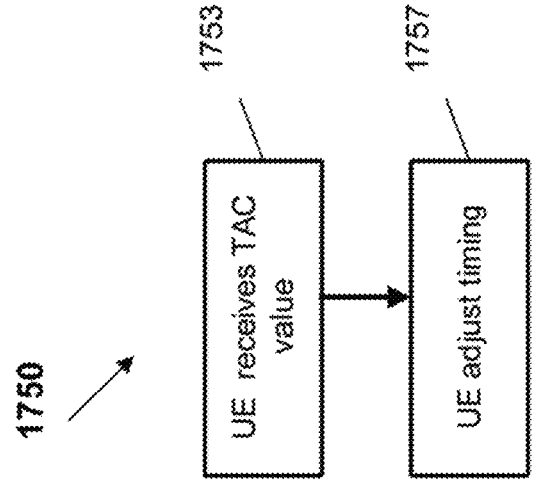
FIG. 17B is flow diagram illustrating a first embodiment of a method of path propagation delay correction performed by a base station according to some aspects of some of various exemplary embodiments of the present disclosure.
Figure 17A:
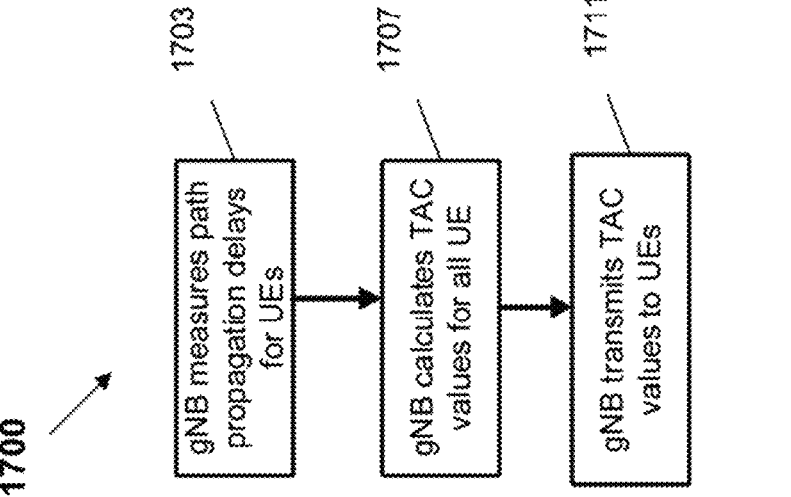
FIG. 17A is flow diagram illustrating a second embodiment of a method of path propagation delay correction performed by a User Equipment (UE) according to some aspects of some of various exemplary embodiments of the present disclosure.

FIG. 17A is a flow diagram of an exemplary method for a gNB performing TAC process according to some aspects of some of various exemplary embodiments of the present disclosure. The method 1700 is described herein with reference to exemplary networks 1200, 1250.

At step 1703, gNB measures path propagation delays for all UEs in the cell gNB serving on a regular basis. The path propagation delay may be received during RACH process via PRACH.

At step 1707, the gNB calculates a TA correction values and transmits the TAC values to the UEs 1711 so that all the UEs UL transmission are aligned as $$T_{dif} = |T_{meas} - T_{target}| \qquad (3)$$

$T_{meas}$ is the estimated TA by the gNB, and $T_{target}$ is the desired TA. The gNB may transmit TA correction value to the UEs in RAR via PRACH.

FIG. 17A is a flow diagram of an exemplary method for a gNB performing TAC process according to some aspects of some of various exemplary embodiments of the present disclosure. The method 1700 is described herein with reference to exemplary networks 1200, 1250.

FIG. 17B is a flow diagram of an exemplary method for a UE performing TA alignment process according to some aspects of some of various exemplary embodiments of the present disclosure. The method 1750 is described herein with reference to exemplary networks 1200, 1250.

At step 1753, the UEs receives TAC values from gNB. The UEs may receive TAC values in RAR via PRACH.

At step 1757, the UEs adjust their timing according to the received TAC values from the gNB. In some examples, the UEs may adjust its TA according to equation (2).

It is appreciated that in the methods 1700, 1750 of FIGS. 1700, 1750, the gNB (satellite) has full control to perform the measurements and calculate the adjustments.

Figure 18:
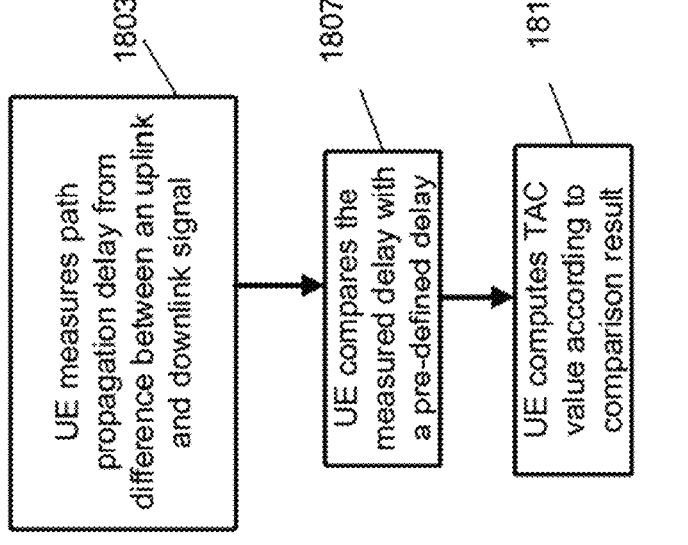
FIG. 18 is flow diagram illustrating a third embodiment of a method of path propagation delay correction performed by a User Equipment (UE) according to some aspects of some of various exemplary embodiments of the present disclosure.

FIG. 18 is a flow diagram of an exemplary method for a UE performing TA alignment process according to some aspects of some of various exemplary embodiments of the present disclosure. The method 1800 is described herein with reference to exemplary networks 1200, 1250.

At step 1803, the UE performs measurement to estimate path propagation delay from the difference between UL and DL signals.

At step 1807, the UE compares the estimated delay with a pre-defined delay.

At step 1811, the UE adjusts its TA according to the difference between the estimated and the pre-defined delay. For example, if the difference is positive, the UE may use smaller correction values; if the difference is negative, the UE may use larger correction values.

It is appreciated that the method 1800 does not need satellite assistance, and therefore an alignment on the satellite side may not be needed.

The exemplary blocks and modules described in this disclosure with respect to the various example embodiments may be implemented or performed with a general-purpose processor, a digital signal processor (DSP), an application specific integrated circuit (ASIC), a field programmable gate array (FPGA), or other programmable logic device, discrete gate or transistor logic, discrete hardware components, or any combination thereof designed to perform the functions described herein. Examples of the general-purpose processor include but are not limited to a microprocessor, any conventional processor, a controller, a microcontroller, or a state machine. In some examples, a processor may be implemented using a combination of devices (e.g., a combination of a DSP and a microprocessor, multiple microprocessors, one or more microprocessors in conjunction with a DSP core, or any other such configuration).

The functions described in this disclosure may be implemented in hardware, software executed by a processor, firmware, or any combination thereof. Instructions or code may be stored or transmitted on a computer-readable medium for implementation of the functions. Other examples for implementation of the functions disclosed herein are also within the scope of this disclosure. Implementation of the functions may be via physically co-located or distributed elements (e.g., at various positions), including being distributed such that portions of functions are implemented at different physical locations.

Computer-readable media includes but is not limited to non-transitory computer storage media. A non-transitory storage medium may be accessed by a general purpose or special purpose computer. Examples of non-transitory storage media include, but are not limited to, random access memory (RAM), read-only memory (ROM), electrically erasable programmable ROM (EEPROM), flash memory, compact disk (CD) ROM or other optical disk storage, magnetic disk storage or other magnetic storage devices, etc. A non-transitory medium may be used to carry or store desired program code means (e.g., instructions and/or data structures) and may be accessed by a general-purpose or special-purpose computer, or a general-purpose or special-purpose processor. In some examples, the software/program code may be transmitted from a remote source (e.g., a website, a server, etc.) using a coaxial cable, fiber optic cable, twisted pair, digital subscriber line (DSL), or wireless technologies such as infrared, radio, and microwave. In such examples, the coaxial cable, fiber optic cable, twisted pair, DSL, or wireless technologies such as infrared, radio, and microwave are within the scope of the definition of medium. Combinations of the above examples are also within the scope of computer-readable media.

As used in this disclosure, use of the term "or" in a list of items indicates an inclusive list. The list of items may be prefaced by a phrase such as "at least one of" or "one or more of". For example, a list of at least one of A, B, or C includes A or B or C or AB (i.e., A and B) or AC or BC or ABC (i.e., A and B and C). Also, as used in this disclosure, prefacing a list of conditions with the phrase "based on" shall not be construed as "based only on" the set of conditions and rather shall be construed as "based at least in part on" the set of conditions. For example, an outcome described as "based on condition A" may be based on both a condition A and a condition B without departing from the scope of this disclosure.

In this specification the terms "comprise", "include" or "contain" may be used interchangeably and have the same meaning and are to be construed as inclusive and open-ending. The terms "comprise", "include" or "contain" may be used before a list of elements and indicate that at least all of the listed elements within the list exist but other elements that are not in the list may also be present. For example, if A comprises B and C, both {B, C} and {B, C, D} are within the scope of A.

The present disclosure, in connection with the accompanied drawings, describes example configurations that are not representative of all the examples that may be implemented or all configurations that are within the scope of this disclosure. The term "exemplary" should not be construed as "preferred" or "advantageous compared to other examples" but rather "an illustration, an instance or an example." By reading this disclosure, including the description of the embodiments and the drawings, it will be appreciated by a person of ordinary skills in the art that the technology disclosed herein may be implemented using alternative embodiments. The person of ordinary skill in the art would appreciate that the embodiments, or certain features of the embodiments described herein, may be combined to arrive at yet other embodiments for practicing the technology described in the present disclosure. Thus, the disclosure is not limited to the examples and designs described herein but is to be accorded the broadest scope consistent with the principles and novel features disclosed herein.

The invention claimed is:

1. A method of time aligning, by a user equipment (UE), comprising the steps of:
   measuring a downlink (DL) signal that includes a first timing advance (TA) value, the DL signal transmitted from a base station (BS) to derive measurement results;
   transmitting the measurement results to the base station (BS);
   computing a second TA value from the first TA value; and
   aligning uplink (UL) transmission timing by the second TA value.

2. The method of claim 1, wherein the measuring includes estimating a time difference between transmission of the downlink (DL) signal from the base station (BS) and reception of the DL signal at the user equipment (UE).

3. The method of claim 1, wherein the transmitted measurement results include a time difference between transmission of the downlink (DL) signal from the base station (BS) and reception of the DL signal at the user equipment (UE).

4. The method of claim 1, wherein the computing includes:
   calculating a first calculated value by raising the first timing advance (TA) value to an Nth power, where N is an integer or real number; and
   multiplying the first calculated value by a scalar quantity.

5. The method of claim 1, wherein the second timing advance (TA) value is equal to the first TA value.

6. A method of time aligning, by a base station (BS), comprising the steps of:
   receiving a message comprising measurement reports from a user equipment (UE);

computing a first timing advance (TA) value from the measurement reports;
   computing a second TA value from the first TA value and a third TA value; and
   transmitting the second TA value to a user equipment (UE).

7. The method of claim 6, wherein the second timing advance (TA) value is equal to a difference between the first TA value and the third TA value.

8. The method of claim 6, wherein the third timing advance (TA) value is a preferred TA value of the user equipment (UE).

9. The method of claim 6, wherein the transmitting is via a physical random access channel (PRACH).

10. The method of claim 6, wherein the computing includes:
   calculating a first calculated value by raising the first timing advance (TA) value to an Nth power, where N is a real or integer number; and
   multiplying the first calculated value by a scalar quantity.

11. The method of claim 6, wherein the first timing advance (TA) value is equal to a difference between a first timing value and a second timing value, and wherein the difference adjust the second TA value and the second TA value is proportional to the difference.

12. The method of claim 11, wherein the second timing advance (TA) value is equal to the first TA value.

13. A user equipment (UE), comprising:
   a transceiver configured to:
      measure a downlink (DL) signal transmitted from a base station (BS), and derive measurement results therefrom;
      transmit the measurement results to the base station (BS); and
      receive from the BS a first timing advance (TA) value; and
   a processor in communication with the transceiver, the processor configured to:
      compute a second TA value from the first TA value; and
      align uplink (UL) transmission timing according to the second TA value;
   wherein, the UE is in communication with the base station (BS), wherein the base station comprises:
   a transceiver configured to measure uplink (UL) signals transmitted from one or more user equipments (UEs), and deriving measurement results therefrom; and
   a processor in communication with the transceiver, the processor configured to:
      compute a first timing advance (TA) value from the measurement results; and
      compute a second TA value from the first TA value and a third TA value; and
      the transceiver further configured to:
         transmit the second TA value to the one or more UEs.

* * * * *